United States Patent
Yu et al.

(10) Patent No.: US 12,550,220 B2
(45) Date of Patent: Feb. 10, 2026

(54) METHOD AND DEVICE USED IN COMMUNICATION NODE FOR WIRELESS COMMUNICATION

(71) Applicant: APOGEE NETWORKS, LLC, Plano, TX (US)

(72) Inventors: Qiaoling Yu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 385 days.

(21) Appl. No.: 18/224,071

(22) Filed: Jul. 20, 2023

(65) Prior Publication Data

US 2023/0371105 A1  Nov. 16, 2023

Related U.S. Application Data

(63) Continuation of application No. PCT/CN2022/073963, filed on Jan. 26, 2022.

(30) Foreign Application Priority Data

Jan. 27, 2021  (CN) .......................... 202110110390.8

(51) Int. Cl.
 *H04W 76/19* (2018.01)
 *H04L 5/00* (2006.01)
 (Continued)

(52) U.S. Cl.
 CPC ........... *H04W 76/19* (2018.02); *H04L 5/0051* (2013.01); *H04W 72/1268* (2013.01); *H04W 72/566* (2023.01)

(58) Field of Classification Search
 CPC ..... H04W 76/18; H04W 76/19; H04W 76/10; H04W 72/566; H04W 72/1268;
 (Continued)

(56) References Cited

U.S. PATENT DOCUMENTS

2020/0100248 A1\*  3/2020  Kim ..................... H04W 48/12
2020/0137821 A1\*  4/2020  Cirik ..................... H04B 7/063
(Continued)

FOREIGN PATENT DOCUMENTS

CN  111385890 A  7/2020
CN  111771418 A  10/2020
(Continued)

OTHER PUBLICATIONS

ISR received in application No. PCT/CN2022/073963 dated Apr. 13, 2022.
(Continued)

*Primary Examiner* — Phong La
(74) *Attorney, Agent, or Firm* — Volpe Koenig

(57) ABSTRACT

A method and device in communication node for wireless communications. A communication node receives each reference signal resource set in the first reference signal resource pool, a measurement performed on a first reference signal resource set is used to trigger a first BFR; determines a resource assignment of a first uplink grant according to logical channel prioritization; when the first uplink grant can accommodate a first MAC CE, transmits a first MAC PDU comprising the first MAC CE on resources of the first uplink grant; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number is 1, the order is a first order.

20 Claims, 6 Drawing Sheets

(51) Int. Cl.
  *H04W 72/1268* (2023.01)
  *H04W 72/566* (2023.01)
(58) Field of Classification Search
  CPC ............... H04W 72/231; H04W 72/56; H04W 72/1263; H04L 5/0051; H04L 5/0048; H04L 5/00; H04L 5/0032
  See application file for complete search history.

(56) References Cited

U.S. PATENT DOCUMENTS

2020/0374960 A1* 11/2020 Deenoo ................. H04B 7/088
2022/0078670 A1*  3/2022 Kung ................... H04W 36/085
2023/0371105 A1* 11/2023 Yu ......................... H04W 76/18
2024/0365328 A1* 10/2024 Cirik .................... H04B 7/0695

FOREIGN PATENT DOCUMENTS

TW    202123749 A  *  6/2021  .......... H04B 17/309
WO    2020167857 A1    8/2020

OTHER PUBLICATIONS

Nokia, Nokia Shanghai Bell Enhancements on Beam Management for Multi-TRP/Panel Transmission 3GPP TSG RAN WG1 #104-e Meeting R1-2101008 Jan. 19, 2021.

* cited by examiner ial patent application No. PCT/CN2022/073963, filed on Jan. 26, 2022, and claims the priority benefit of Chinese Patent Application No. 202110110390.8, filed on Jan. 27, 2021, the full disclosure of which is incorporated herein by reference.

BACKGROUND

Technical Field

The present application relates to transmission methods and devices in wireless communication systems, and in particular to a transmission method and device related to multi-TRP.

RELATED ART

For beam management (BM), 3rd Generation Partnership Project (3GPP) introduced a Beam Failure Recovery (BFR) mechanism for a Special Cell (SpCell) in Release 15 (R15), and introduced a BFR mechanism for a Secondary Cell (SCell) in R16. Through the BFR mechanism, triggering higher-layer Radio Link Failure (RLF) can be avoided. 3GPP Radio Access Network (RAN) #80th meeting decided to carry out a Work Item (WI) of "Further enhancements on Multiple Input Multiple Output (MIMO) for New Radio (NR)" to enhance the BFR mechanism for Multiple Transmit/Receive Point (multi-TRP).

SUMMARY

For a BFR of multi-TRP, one of multiple TRPs in a cell can independently trigger a BFR, however, one TRP triggering a BFR does not mean that other TRPs trigger a BFR, and does not mean that a BFR of a cell is triggered. On the one hand, if there is a large number of TRPs, BFR for multi-TRP execution may be too frequent; on the other hand, if a priority of a BFR MAC CE of multi-TRP is the same as a priority of a BFR MAC CE of the cell, when there are fewer uplink resources, and even if there is some urgent logical channel data or MAC CEs, an assignment of a BFR MAC CE for a multi-TRP will be prioritized, thus affecting the system performance. Therefore, it is necessary to enhance the priority of the BFR MAC CE for the multi-TRP.

To address the above problem, the present application provides a solution. It should be noted that though the present application only took the Uu interface scenario for example in the statement above; the present application is also applicable to scenarios such as Sidelink (SL) transmission or Integrated Access and Backhaul (IAB), where similar technical effects can be achieved. Additionally, the adoption of a unified solution for various scenarios contributes to the reduction of hardware complexity and costs.

In one embodiment, interpretations of the terminology in the present application refer to definitions given in the 3GPP T S38 series.

In one embodiment, interpretations of the terminology in the present application refer to definitions given in the 3GPP T S36 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:

receiving a first signaling, the first signaling configuring a first reference signal resource pool, the first reference signal resource pool comprising at least one reference signal resource set; receiving each reference signal resource set in the first reference signal resource pool, a measurement performed on a first reference signal resource set being used to trigger a first BFR, the first reference signal resource set being a reference signal resource set in the first reference signal resource pool;

determining a resource assignment of a first uplink grant according to logical channel prioritization; and when the first uplink grant can accommodate a first MAC CE, transmitting a first MAC PDU comprising the first MAC CE on resources of the first uplink grant;

herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, a problem to be solved in the present application comprises: how to determine the order of the first MAC CE in the logical channel prioritization.

In one embodiment, characteristics of the above method comprise: a number of the reference signal resource set(s) comprised in the first reference signal resource pool is used to determine an order of the first MAC CE in the logical channel prioritization.

In one embodiment, characteristics of the above method comprise: determining the order of the first MAC CE in the logical channel prioritization based on whether the first MAC CE is for a BFR MAC CE of a TRP or a BFR MAC CE of the first cell.

In one embodiment, characteristics of the above method comprise: the order of the first MAC CE in the logical channel prioritization when the first MAC CE is a BFR MAC CE for a TRP is lower than the order of the first MAC CE in the logical channel prioritization when the first MAC CE is a BFR MAC CE for the first cell.

In one embodiment, advantages of the above method comprise: ensuring priority transmission of other MAC CEs.

In one embodiment, advantages of the above method comprise: improving the system performance.

According to one aspect of the present application, it is characterized in that the number of the reference signal resource sets comprised in the first reference signal resource pool is greater than 1, the first candidate order set comprises a third order, and the third order is different from the second order.

According to one aspect of the present application, it is characterized in that the first signaling indicates the order of the first MAC CE in the logical channel prioritization from the first candidate order set.

According to one aspect of the present application, it is characterized in that the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

According to one aspect of the present application, it is characterized in that the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

According to one aspect of the present application, it is characterized in that a second signaling is received;

herein, the second signaling is used to indicate a first target reference signal resource, and the first parameter set comprises whether the first target reference signal resource is associated with any reference signal resource in the first reference signal resource set; if the first target reference signal resource is associated with any reference signal resource in the first reference signal resource set, the order of the first MAC CE in the logical channel prioritization is the third order; if the first target reference signal resource is not associated with any reference signal resource in the first reference signal resource set, the order of the first MAC CE in the logical channel prioritization is the second order.

According to an aspect of the present application, it is characterized in that when the number of the reference signal resource set(s) comprised in the first reference signal resource pool is 1, the first MAC CE comprises a first identity, and the first identity is associated with the first reference signal resource set.

The present application provides a method in a second node for wireless communications, comprising:
 transmitting a first signaling, the first signaling configuring a first reference signal resource pool, the first reference signal resource pool comprising at least one reference signal resource set; transmitting all reference signal resources in each reference signal resource set in the first reference signal resource pool, a measurement performed on a first reference signal resource set being used to trigger a first BFR, the first reference signal resource set being a reference signal resource set in the first reference signal resource pool; resource assignment of a first uplink grant is determined based on logical channel prioritization; and
 receiving a first MAC PDU comprising a first MAC CE; when the first uplink grant can accommodate the first MAC CE, the first MAC PDU comprising the first MAC CE being transmitted on resources of the first uplink grant;
 herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

According to one aspect of the present application, it is characterized in that the number of the reference signal resource sets comprised in the first reference signal resource pool is greater than 1, the first candidate order set comprises a third order, and the third order is different from the second order.

According to one aspect of the present application, it is characterized in that the first signaling indicates the order of the first MAC CE in the logical channel prioritization from the first candidate order set.

According to one aspect of the present application, it is characterized in that the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

According to one aspect of the present application, it is characterized in that the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

According to one aspect of the present application, comprising:
 transmitting a second signaling;
 herein, the second signaling is used to indicate a first target reference signal resource, and the first parameter set comprises whether the first target reference signal resource is associated with any reference signal resource in the first reference signal resource set; if the first target reference signal resource is associated with any reference signal resource in the first reference signal resource set, the order of the first MAC CE in the logical channel prioritization is the third order; if the first target reference signal resource is not associated with any reference signal resource in the first reference signal resource set, the order of the first MAC CE in the logical channel prioritization is the second order.

According to an aspect of the present application, it is characterized in that when the number of the reference signal resource set(s) comprised in the first reference signal resource pool is 1, the first MAC CE comprises a first identity, and the first identity is associated with the first reference signal resource set.

The present application provides a first node for wireless communications, comprising:
a first receiver, receiving a first signaling, the first signaling configuring a first reference signal resource pool, the first reference signal resource pool comprising at least one reference signal resource set;
receiving each reference signal resource set in the first reference signal resource pool, a measurement performed on a first reference signal resource set being used to trigger a first BFR, the first reference signal resource set being a reference signal resource set in the first reference signal resource pool; determining a resource assignment of a first uplink grant according to logical channel prioritization; and
a first transmitter, when the first uplink grant can accommodate a first MAC CE, transmitting a first MAC PDU comprising the first MAC CE on resources of the first uplink grant;
herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

The present application provides a second node for wireless communications, comprising:
a second transmitter, transmitting a first signaling, the first signaling configuring a first reference signal resource pool, the first reference signal resource pool comprising at least one reference signal resource set; transmitting all reference signal resources in each reference signal resource set in the first reference signal resource pool, a measurement performed on a first reference signal resource set being used to trigger a first BFR, the first reference signal resource set being a reference signal resource set in the first reference signal resource pool; resource assignment of a first uplink grant is determined based on logical channel prioritization; and
a second receiver, receiving a first MAC PDU comprising a first MAC CE; when the first uplink grant can accommodate the first MAC CE, the first MAC PDU comprising the first MAC CE being transmitted on resources of the first uplink grant;
herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the present application has the following advantages over conventional schemes:
a priority of a BFR MAC CE of multi-TRP is lower than a BFR AMC CE in a cell, thus ensuring the transmission of some other MAC CEs;
adjusting a priority of a BFR MAC CE of multi-TRP based on a first parameter set to optimize resource assignment;
improving a priority of a BFR MAC CE of multi-TRP based on a first parameter set to optimize the resource assignment;
improving the system performance.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
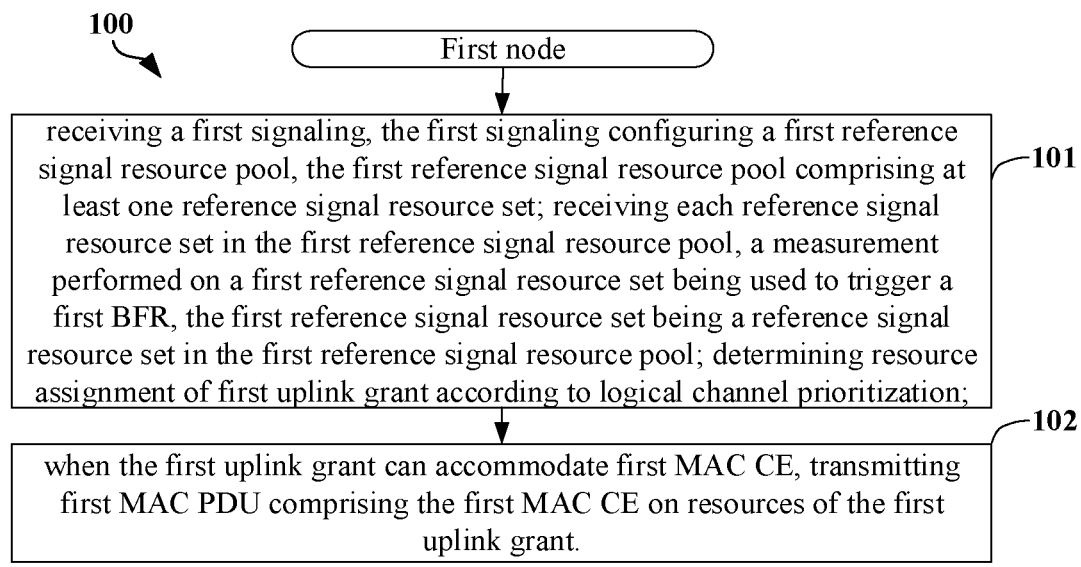
FIG. 1 illustrates a flowchart of transmission of a first signaling, a first reference signal resource pool and a first MAC PDU comprising a first MAC CE according to one embodiment of the present application.

Embodiment 1 illustrates a flowchart of transmission of a first signaling, a first reference signal resource pool and a first MAC PDU comprising a first MAC CE according to one embodiment of the present application, as shown in FIG. 1. In FIG. 1, each step represents a step, it should be particularly noted that the sequence order of each box herein does not imply a chronological order of steps marked respectively by these boxes.

In embodiment 1, the first node in the present application receives a first signaling in step 101, the first signaling configures a first reference signal resource pool, the first reference signal resource pool comprises at least one reference signal resource set; receives each reference signal resource set in the first reference signal resource pool, a measurement performed on a first reference signal resource set is used to trigger a first BFR, the first reference signal resource set is a reference signal resource set in the first reference signal resource pool; determines a resource assignment of a first uplink grant according to logical channel prioritization; when the first uplink grant can accommodate a first MAC CE in step 102, transmits a first MAC PDU comprising the first MAC CE on resources of the first uplink grant; herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the first signaling is transmitted via an air interface.

In one embodiment, the first signaling is transmitted via an antenna port.

In one embodiment, the first signaling comprises a downlink signaling.

In one embodiment, the first signaling comprises all or part of a higher-layer signaling.

In one embodiment, the first signaling comprises a Radio Resource Control (RRC) message.

In one subembodiment of the embodiment, a name of the RRC message comprises RRCReconfiguration.

In one subembodiment of the embodiment, a name of the RRC message comprises an SIB1 message.

In one embodiment, the first signaling comprises one or multiple Information Elements (IEs) in an RRC message.

In one subembodiment of the embodiment, a name of one IE in one or multiple IEs comprises RadioLinkMonitoringConfig.

In one subembodiment of the embodiment, a name of one IE in one or multiple IEs comprises BWP-DownlinkDedicated.

In one subembodiment of the embodiment, a name of one IE in one or multiple IEs comprises BWP-Downlink.

In one subembodiment of the embodiment, a name of one IE in one or multiple IEs comprises ServingCellConfig.

In one embodiment, the first signaling comprises one field in an RRC message.

In one subembodiment of the above embodiment, a name of the field comprises beamFailureRecoveryTimer.

In one embodiment, the first signaling comprises one or multiple fields in an RRC message.

In one subembodiment of the embodiment, a name of the one or multiple fields comprises failureDetectionResourcesToAddModList.

In one subembodiment of the embodiment, a name of the one or multiple fields comprises RadioLinkMonitoringRS.

In one subembodiment of the embodiment, a name of the one or multiple fields comprises ssb-Index.

In one subembodiment of the embodiment, a name of the one or multiple fields comprises csi-RS-Index.

In one subembodiment of the embodiment, a name of the one or multiple fields comprises RadioLinkMonitoringRS-Id.

In one subembodiment of the embodiment, a name of the one or multiple fields comprises purpose, and the purpose is set as at least one of beamFailure or rlf.

In one embodiment, for the specific definition of the failureDetectionResources, refer to section 6 in 3GPP TS38.213.

In one embodiment, the phrase that the first signaling configures a first reference signal resource pool comprises: the first reference signal resource pool comprises one or multiple IEs in the first signaling.

In one embodiment, the phrase that the first signaling configures a first reference signal resource pool comprises: the first reference signal resource pool comprises one or multiple fields in the first signaling.

In one embodiment, the phrase that the first signaling configures a first reference signal resource pool comprises: one or multiple fields in the first signaling is used to determine the first reference signal resource pool.

In one embodiment, the phrase that the first signaling configures a first reference signal resource pool comprises: one or multiple IEs in the first signaling is used to determine the first reference signal resource pool.

In one embodiment, the phrase that the first signaling configures a first reference signal resource pool comprises: the first signaling indicates the first reference signal resource pool.

In one embodiment, the phrase that the first signaling configures a first reference signal resource pool comprises: the first reference signal resource pool is determined based on the first signaling.

In one embodiment, the first reference signal resource pool indicates a reference signal resource used to detect whether beam failure occurs in the first cell.

In one embodiment, the first reference signal resource pool indicates a reference signal resource used to detect whether beam failure occurs in a TRP of the first cell.

In one subembodiment of the embodiment, a reference signal resource set in the first reference signal resource pool indicates a reference signal resource used to detect whether beam failure occurs in a TRP in the first cell.

In one embodiment, the first reference signal resource pool is associated with a Bandwidth Part (BWP).

In one embodiment, the first reference signal resource pool comprises a $\bar{q}_0$.

In one embodiment, the first reference signal resource pool comprises a subset in a $\bar{q}_0$.

In one embodiment, a reference signal resource set in the first reference signal resource pool comprises a $\bar{q}_0$ or a subset in $\bar{q}_0$.

In one embodiment, the first reference signal resource pool comprises a $\bar{q}_0$, and a reference signal resource set in the first reference signal resource pool comprises a subset in the q.

In one embodiment, for the specific definition of the $\bar{q}_0$, refer to section 6 in 3GPP TS38. 213.

In one embodiment, the phrase that the first reference signal resource pool comprises at least one reference signal resource set comprises: the first reference signal resource pool comprises N1 reference signal resource set(s), N1 being a positive integer.

In one subembodiment of the above embodiment, N1 is equal to 1.

In one subembodiment of the above embodiment, N1 is greater than 1.

In one embodiment, the phrase that the first reference signal resource pool comprises at least one reference signal resource set comprises: the first reference signal resource pool consists of at least one reference signal resource set.

In one embodiment, the phrase that the first reference signal resource pool comprises at least one reference signal resource set comprises: the first reference signal resource pool comprises one or multiple reference signal resource sets.

In one embodiment, the first reference signal resource pool is associated with the first cell, and any reference signal resource set in the first reference signal resource pool is associated with a TRP in the first cell.

In one embodiment, a reference signal resource set in the first reference signal resource pool is associated with a cell.

In one embodiment, a reference signal resource set in the first reference signal resource pool is associated with a TRP.

In one embodiment, a reference signal resource set in the first reference signal resource pool is associated with a DU.

In one embodiment, a reference signal resource set in the first reference signal resource pool is associated with a communication node.

In one embodiment, the TRP comprises one or multiple beams.

In one embodiment, the TRP is a transceiver device.

In one embodiment, the first node supports Multiple Transmit/Receive Point (multi-TRP) operation.

In one embodiment, the first cell comprises a TRP.

In one embodiment, the first cell comprises multiple TRPs.

In one embodiment, for multi-TRP, the first cell can schedule the first node from two TRPs.

In one embodiment, multi-TRP supports two TRPs.

In one embodiment, multi-TRP supports more than two TRPs.

In one embodiment, multi-TRP supports at least one of single-DCI or multi-DCI.

In one embodiment, the first reference signal resource pool is used for Beam Failure Detection (BFD) in the Beam Failure Recovery (BFR) mechanism.

In one embodiment, for the specific definition of beam failure recovery, refer to section 6 in 3GPP TS38.213.

In one embodiment, a reference signal resource set in the first reference signal resource pool corresponds to an index.

In one subembodiment of the embodiment, the index corresponds to a TRP of the first cell.

In one subembodiment of the embodiment, a name of an index comprises set or SET.

In one subembodiment of the embodiment, a name of an index comprises CORESETPoolIndex.

In one subembodiment of the embodiment, a name of an index comprises Control Resource Set (CORESET) or coreset.

In one subembodiment of the embodiment, a name of an index comprises TRP.

In one subembodiment of the embodiment, a name of an index comprises Transmission Configuration Indicator (TCI) or tci.

In one subembodiment of the embodiment, a name of an index comprises group or GROUP.

In one subembodiment of the embodiment, a name of an index comprises link or LINK.

In one subembodiment of the embodiment, an index corresponding to the first reference signal resource set comprises an index of a CORESET set.

In one subembodiment of the embodiment, an index corresponding to the first reference signal resource set comprises an index of a CORESET.

In one subembodiment of the embodiment, an index corresponding to the first reference signal resource set comprises an index of a search space set.

In one embodiment, the first reference signal resource pool when the number of the reference signal resource set(s) comprised in the first reference signal resource pool is 1 is the same as the first reference signal resource pool when the number of the reference signal resource sets comprised in the first reference signal resource pool is greater than 1.

In one subembodiment of the embodiment, a reference signal resource in the first reference signal resource pool when the number of the reference signal resource set(s) comprised in the first reference signal resource pool is 1 is the same as a reference signal resource in the first reference signal resource pool when the number of the reference signal resource sets comprised in the first reference signal resource pool is greater than 1.

In one subembodiment of the embodiment, a number of reference signal resource(s) comprised in the first reference signal resource pool when the number of the reference signal resource set(s) comprised in the first reference signal resource pool is 1 is the same as a number of reference signal resource(s) comprised in the first reference signal resource pool when the number of the reference signal resource sets comprised in the first reference signal resource pool is greater than 1.

In one embodiment, the first reference signal resource pool when the number of the reference signal resource set(s) comprised in the first reference signal resource pool is 1 is different from the first reference signal resource pool when the number of the reference signal resource sets comprised in the first reference signal resource pool is greater than 1.

In one subembodiment of the embodiment, a reference signal resource in the first reference signal resource pool when the number of the reference signal resource set(s) comprised in the first reference signal resource pool is 1 is different from a reference signal resource in the first reference signal resource pool when the number of the reference signal resource sets comprised in the first reference signal resource pool is greater than 1.

In one subembodiment of the embodiment, a number of reference signal resource(s) comprised in the first reference signal resource pool when the number of the reference signal resource set(s) comprised in the first reference signal resource pool is 1 is different from a number of reference signal resource(s) comprised in the first reference signal resource pool when the number of the reference signal resource sets comprised in the first reference signal resource pool is greater than 1.

In one embodiment, any reference signal resource in each reference signal resource set in the first reference signal resource pool is transmitted through an air interface.

In one embodiment, any reference signal resource in each reference signal resource set in the first reference signal resource pool is transmitted through an antenna port.

In one embodiment, any reference signal resource in each reference signal resource set in the first reference signal resource pool comprises a downlink signal.

In one embodiment, any reference signal resource in each reference signal resource set in the first reference signal resource pool comprises a physical-layer signal.

In one embodiment, any reference signal resource in each reference signal resource set in the first reference signal resource pool comprises a reference signal, and the reference signal is associated with an antenna port.

In one embodiment, any reference signal resource in each reference signal resource set in the first reference signal resource pool is associated with a beam.

In one embodiment, any reference signal resource in each reference signal resource set in the first reference signal resource pool is associated with an antenna port.

In one embodiment, any reference signal resource in each reference signal resource set in the first reference signal resource pool comprises a Synchronization Signal Block (SSB).

In one embodiment, any reference signal resource in each reference signal resource set in the first reference signal resource pool comprises a Channel State Information-Reference Signal (CSI-RS) resource.

In one embodiment, any reference signal resource in each reference signal resource set in the first reference signal resource pool comprises a periodic CSI-RS.

In one embodiment, any reference signal resource in each reference signal resource set in the first reference signal resource pool comprises an SSB indicated by an SSB index.

In one embodiment, any reference signal resource in each reference signal resource set in the first reference signal resource pool comprises a CSI-RS resource or an SSB associated with an SSB index.

In one embodiment, any reference signal resource in each reference signal resource set in the first reference signal resource pool is indexed by at least one of an SSB-Index or a NZP-CSI-RS-ResourceId.

In one embodiment, any reference signal resource in each reference signal resource set in the first reference signal resource pool comprises a Synchronization Signal/Physical Broadcast CHannel (SS/PBCH) Block.

In one embodiment, any reference signal resource in each reference signal resource set in the first reference signal resource pool comprises an SS/PBCH block indicated by an SS/PBCH block.

In one embodiment, any reference signal resource in each reference signal resource set in the first reference signal resource pool corresponds to an SSB of a same index.

In one embodiment, any reference signal resource in each reference signal resource set in the first reference signal resource pool is indicated by an SSB-index or NZP-CSI-RS-ResourceId.

In one embodiment, any reference signal resource in each reference signal resource set in the first reference signal resource pool is a reference signal resource of the first cell.

In one embodiment, at least one reference signal resource in the first reference signal resource pool is not a reference signal resource of the first cell.

In one embodiment, there does not exist identical reference signal resource in any two reference signal resource sets in the first reference signal resource pool.

In one embodiment, there exists at least one identical reference signal resource in any two reference signal resource sets in the first reference signal resource pool.

In one embodiment, the action of receiving each reference signal resource set in the first reference signal resource pool comprises: receiving partial reference signal resources in each reference signal resource set in the first reference signal resource pool.

In one embodiment, the action of receiving each reference signal resource set in the first reference signal resource pool comprises: receiving all reference signal resources in each reference signal resource set in the first reference signal resource pool.

In one embodiment, the action of receiving each reference signal resource set in the first reference signal resource pool comprises: monitoring all reference signal resources in each reference signal resource set in the first reference signal resource pool.

In one embodiment, the action of receiving each reference signal resource set in the first reference signal resource pool comprises: monitoring and receiving all reference signal resources in each reference signal resource set in the first reference signal resource pool.

In one embodiment, the meaning of monitoring comprises monitoring.

In one embodiment, the meaning of monitoring comprises detecting.

In one embodiment, the meaning of monitoring comprises monitoring.

In one embodiment, the meaning of monitoring comprises receiving.

In one embodiment, when a number of reference signal resource set(s) comprised in the first reference signal resource pool is 1, a measurement performed on the first reference signal resource set is used to trigger a first BFR, and the first BFR indicates that beam failure occurs in the first cell.

In one embodiment, when the number of the reference signal resource sets comprised in the first reference signal resource pool is greater than 1, a measurement performed on the first reference signal resource set is used to trigger a first BFR, and the first BFR indicates that beam failure occurs in a TRP associated with the first reference signal resource set in the first cell.

In one embodiment, the first BFR is for the first cell.

In one embodiment, the first BFR is for a TRP in the first cell.

In one embodiment, the first BFR comprises a BFR for the first cell.

In one embodiment, the first BFR refers to a BFR associated with the first reference signal resource pool; the number of reference signal resource set(s) comprised in the first reference signal resource pool is 1.

In one embodiment, the first BFR comprises a BFR for a TRP in the first cell.

In one embodiment, the first BFR comprises a BFR for multiple TRPs in the first cell.

In one embodiment, the first BFR comprises a BFR for a TRP associated with the first reference signal resource set in the first cell.

In one embodiment, the first BFR refers to a BFR of the first reference signal resource set associated with multiple reference signal resource sets in the first reference signal resource pool; the number of reference signal resource sets comprised in the first reference signal resource pool is greater than 1.

In one embodiment, the meaning of the triggering comprises: trigger.

In one embodiment, the meaning of the triggering comprises: start.

In one embodiment, the phrase that a measurement performed on a first reference signal resource set is used to trigger a first BFR comprises: a measurement performed on all reference signal resources in the first reference signal resource set is used to trigger the first BFR.

In one embodiment, the phrase that a measurement performed on a first reference signal resource set is used to trigger a first BFR comprises: reception quality of each reference signal resource in the first reference signal resource set being lower than a first threshold is used to determine transmitting a first indication to a higher layer; a number of continuously receiving the first indication from a lower layer reaching a first value is used to trigger a first BFR.

In one subembodiment of the embodiment, a name of the first value comprises beamFailureInstanceMaxCount.

In one subembodiment of the embodiment, a name of the first value comprises at least one of beam, Failure, Instance, Max, Count, TRP, Link, or Entity.

In one subembodiment of the embodiment, when the number of reference signal resource set(s) comprised in the first reference signal resource pool is 1, the first value is equal to beamFailureInstanceMaxCount.

In one subembodiment of the embodiment, when the number of reference signal resource sets comprised in the first reference signal resource pool is greater than 1, the first value is equal to a sum of beamFailureInstanceMaxCount and a second value.

In one subsidiary embodiment of the above subembodiment, the second value is a non-negative integer.

In one subsidiary embodiment of the above subembodiment, the second value is a non-positive integer.

In one subembodiment of the embodiment, the first threshold is configurable.

In one subembodiment of the embodiment, the first threshold is pre-configured.

In one subembodiment of the embodiment, the first threshold is a real number.

In one subembodiment of the embodiment, the first threshold is a non-negative real number.

In one subembodiment of the above embodiment, the first threshold is a non-negative real number not greater than 1.

In one subembodiment of the above embodiment, the first threshold is one of Qout_L, Qout_LR_SSB or Qout_LR_CSI-RS.

In one subembodiment of the above embodiment, for the specific definition of the Qout_L, Qout_LR_SSB and Qout_LR_CSI-RS, refer to 3GPP TS38.133.

In one subembodiment of the above embodiment, the first threshold is configured through a field in an RRC message, and the field comprises rlmInSyncOutOfSyncThreshold.

In one subembodiment of the above embodiment, the phrase that reception quality of each reference signal resource in the first reference signal resource set being lower than the first threshold is used to determine transmitting a first indication to a higher layer comprises: when reception quality of each reference signal resource in the first reference signal resource set is lower than a first threshold, the first indication is transmitted to the higher layer.

In one subembodiment of the above embodiment, the phrase that reception quality of each reference signal resource in the first reference signal resource set being lower than the first threshold is used to determine transmitting a first indication to a higher layer comprises: reception quality of all reference signal resources in the first reference signal resource set being lower than the first threshold is used to determine transmitting the first indication to the higher layer.

In one subembodiment of the embodiment, the first indication comprises a beam failure instance.

In one subembodiment of the embodiment, the higher layer comprises a MAC layer.

In one subembodiment of the embodiment, the higher layer comprises a protocol layer above the MAC layer.

In one subembodiment of the embodiment, the lower layer comprises a PHY layer.

In one subembodiment of the embodiment, the lower layer comprises a protocol layer below the MAC layer.

In one subembodiment of the embodiment, the phrase that a number of continuously received the first indication(s) from a lower layer reaches a first value is used to trigger a first BFR comprises: when a number of continuously received first indication(s) from a lower layer reaches a first value, the first BFR is triggered.

In one subembodiment of the embodiment, the phrase that a number of continuously received the first indication from a lower layer reaches a first value is used to trigger a first BFR comprises: a first counter reaching the first value is used to trigger the first BFR, and the first counter is used to determine a number of continuously received the first indication(s) from the lower layer.

In one subsidiary embodiment of the subembodiment, when the first indication is received, a timer beamFailureRecoveryTimer is started, and when the timer beamFailureRecoveryTimer is expired, the first counter is set as 0.

In one subsidiary embodiment of the subembodiment, the first counter comprises BFI_COUNTER.

In one subsidiary embodiment of the subembodiment, a name of the first counter comprises at least one of BFI, COUNTER, TRP, LINK, or per.

In one subembodiment of the embodiment, when the number of reference signal resource set(s) comprised in the first reference signal resource pool is 1, the first indication is for the first cell.

In one subembodiment of the embodiment, when the number of reference signal resource sets comprised in the first reference signal resource pool is greater than 1, the first indication is for a TRP in the first cell.

In one embodiment, the phrase that the first reference signal resource set is a reference signal resource set in the first reference signal resource pool comprises: the first reference signal resource pool comprises the first reference signal resource set.

In one embodiment, the phrase that the first reference signal resource set is a reference signal resource set in the first reference signal resource pool comprises: when the number of reference signal resource sets comprised in the first reference signal resource pool is greater than 1, the first reference signal resource set is one of multiple reference signal resource sets in the first reference signal resource pool.

In one embodiment, the phrase that the first reference signal resource set is a reference signal resource set in the first reference signal resource pool comprises: when the number of reference signal resource set(s) comprised in the first reference signal resource pool is 1, the first reference signal resource set is the first reference signal resource pool.

In one embodiment, the phrase of determining a resource assignment of a first uplink grant based on a logical channel prioritization comprises: the resource assignment of the first uplink grant is related to the logical channel prioritization.

In one embodiment, the phrase of determining a resource assignment of a first uplink grant based on a logical channel prioritization comprises: the logical channel prioritization is an influencing factor in determining the resource assignment of the first uplink grant.

In one embodiment, the phrase of determining a resource assignment of a first uplink grant based on a logical channel prioritization comprises: the logical channel prioritization is used to determine the resource assignment of the first uplink grant.

In one embodiment, the logical channel prioritization comprises Logical Channel Prioritization (LCP).

In one embodiment, the logical channel prioritization comprises an order in which logical channels are prioritized.

In one subembodiment of the above embodiment, the order in which the logical channels are prioritized is used to determine an order in which one of the logical channels is prioritized.

In one subembodiment of the above embodiment, for the order in which the logical channels are prioritized, refer to section 5.4.3 in 3GPP TS 38.321.

In one subembodiment of the above embodiment, for the order in which the logical channels are prioritized, refer to section 5.4.3 in 3GPP TS 36.321.

In one subembodiment of the above embodiment, the order in which the logical channels are prioritized comprises order of logical channels, with the higher the position, the higher the priority.

In one subembodiment of the above embodiment, a first logical channel in the order in which the logical channel is prioritized has a highest priority, while a last logical channel has a lowest priority.

In one subembodiment of the above embodiment, priorities of the logical channels in the order in which the logical channels are prioritized are sorted in a descending order.

In one embodiment, resources are assigned in the order in which the logical channels are prioritized.

In one embodiment, the logical channel prioritization comprises Bj of a logical channel.

In one subembodiment of the above embodiment, for the definition and calculation of the Bj of the logical channel, refer to section 5.4.3 in 3GPP TS 38.321.

In one subembodiment of the above embodiment, for the definition and calculation of the Bj of the logical channel, refer to section 5.4.3 in 3GPP TS 36.321.

In one subembodiment of the above embodiment, the larger the Bj of the logical channel, the higher the priority.

In one embodiment, resources are assigned in a descending order according to the Bj of the logical channel.

In one embodiment, a logical channel prioritization comprises a priority of a logical channel.

In one subembodiment of the above embodiment, the priority of the logical channel is configured by an RRC signaling.

In one subembodiment of the above embodiment, an RRC signaling indicator used for configuring the priority of the logical channel is a number from 1 to 16.

In one subembodiment of the above embodiment, an RRC signaling indicator used for configuring the priority of the logical channel is a number from 1 to 8.

In one subembodiment of the above embodiment, the smaller a number from 1 to 16, the higher the priority.

In one subembodiment of the above embodiment, the smaller a number from 1 to 8, the higher the priority.

In one embodiment, resources are assigned according to an ascending order of the priority of the logical channel.

In one embodiment, the resource assignment comprises assigning resources in the first uplink grant.

In one embodiment, the first uplink grant comprises UL-SCH resources.

In one embodiment, the first uplink grant comprises resources for an uplink grant (UL grant).

In one embodiment, the resources of the first uplink grant are transferred from the physical layer to the MAC layer.

In one embodiment, the first uplink grant is dynamically received on a Physical Downlink Control Channel (PDCCH).

In one embodiment, the first uplink grant is received in a Random Access Response (RAR).

In one embodiment, the first uplink grant is RRC semi-persistently configured.

In one embodiment, the first uplink grant is determined according to resources associated with a Physical Uplink Shared Channel (PUSCH) of Message A (MsgA).

In one embodiment, the first uplink grant is used to determine time-frequency resources.

In one embodiment, the first uplink grant is used to determine at least one of time-domain resources, frequency-domain resources or code-domain resources.

In one embodiment, the first uplink grant is used to determine a Physical Resource Block (PRB).

In one embodiment, the resources of the first uplink grant are a transmission channel.

In one embodiment, the transmission channel is an Uplink Shared Channel (UL-SCH).

In one embodiment, the first MAC CE comprises a Medium Access Control (MAC) Control Element (CE).

In one embodiment, the first MAC PDU comprises a MAC Protocol Data Unit (PDU).

In one embodiment, the phrase that "when the first uplink grant can accommodate a first MAC CE, transmitting a first MAC PDU comprising the first MAC CE on resources of the first uplink grant" comprises: when the first uplink grant can accommodate the first MAC CE, instructing multiplexing and assembly procedure to generate the first MAC CE, and transmitting the first MAC PDU comprising the first MAC CE on resources of the first uplink grant.

In one embodiment, the phrase that "when the first uplink grant can accommodate a first MAC CE, transmitting a first MAC PDU comprising the first MAC CE on resources of the first uplink grant" comprises: if the first uplink grant is available and can accommodate the first MAC CE, transmitting the first MAC PDU comprising the first MAC CE on resources of the first uplink grant.

In one embodiment, the phrase that the first uplink grant can accommodate a first MAC CE comprises: the first uplink grant can accommodate a first MAC CE and a subheader of the first MAC CE.

In one embodiment, the phrase that the first uplink grant can accommodate a first MAC CE comprises: after the prioritization of the logical channel is completed, resources assigned to the first MAC CE by the first uplink grant are greater than a sum of a size of the first MAC CE and a size of the sub-header of the first MAC CE.

In one embodiment, the phrase that the first uplink grant can accommodate a first MAC CE comprises: after the prioritization of the logical channel is completed, resources assigned to the first MAC CE by the first uplink grant are greater than a size of the first MAC CE.

In one embodiment, the phrase that the first uplink grant can accommodate a first MAC CE comprises: after the prioritization of the logical channel is completed, resources assigned to the first MAC CE by the first uplink grant are greater than a sum of a size of the first MAC CE and a size of the sub-header of the first MAC CE.

In one embodiment, when the first MAC CE can be accommodated by the first uplink grant, the first MAC CE is generated.

In one embodiment, the meaning of generation comprises generate.

In one embodiment, when the first uplink grant is available and the first MAC CE can be accommodated by the first uplink grant, the first MAC CE is generated.

In one embodiment, the first MAC CE is generated by the Multiplexing and Assembly procedure.

In one embodiment, the phrase of transmitting a first MAC PDU comprising the first MAC CE on resources of the first uplink grant comprises: submitting the first MAC PDU comprising the first MAC CE to the lower layer and transmitting it through resources of the first uplink grant.

In one embodiment, the phrase of transmitting a first MAC PDU comprising the first MAC CE on resources of the first uplink grant comprises: commanding the physical layer to generate a transmission for the first uplink grant, and the first uplink grant comprising the first MAC PDU of the first MAC CE.

In one embodiment, when resources of the first uplink grant are available, and when the first uplink grant can accommodate the first MAC CE, a first MAC PDU comprising the first MAC CE is transmitted on resources of the first uplink grant.

In one embodiment, when resources of the first uplink grant are available, and when the first uplink grant cannot accommodate the first MAC CE, a first MAC PDU comprising the first MAC CE is dropped to be transmitted on resources of the first uplink grant.

In one embodiment, when resources of the first uplink grant are available and the first uplink grant can accommodate at least one of Configured Grant Confirmation MAC CE, Multiple Entry Configured Grant Confirmation MAC CE, Sidelink Configured Grant Confirmation MAC CE, or LBT failure MAC CE, but cannot accommodate the first MAC CE, a first MAC PDU comprising the first MAC CE is dropped to be transmitted on resources of the first uplink grant.

In one embodiment, the first cell comprises a Serving Cell.

In one embodiment, the first cell comprises a special cell (SpCell).

In one subembodiment of the embodiment, the SpCell comprises a Primary Cell (PCell) of a Master Cell Group (MCG).

In one subembodiment of the embodiment, the SpCell comprises a Primary SCG Cell (PSCell) of a Secondary Cell Group (SCG).

In one embodiment, the first cell comprises a Secondary Cell (SCell).

In one embodiment, the phrase that any reference signal resource set in the first reference signal resource pool comprises at least one reference signal resource of a first cell comprises: all reference signal resources in any reference signal resource set in the first reference signal resource pool are associated with the first cell.

In one embodiment, the phrase that any reference signal resource set in the first reference signal resource pool comprises at least one reference signal resource of a first cell comprises: partial reference signal resources in any reference signal resource set in the first reference signal resource pool are associated with the first cell.

In one embodiment, the phrase that any reference signal resource set in the first reference signal resource pool comprises at least one reference signal resource of a first cell comprises: any reference signal resource set in the first reference signal resource pool comprises one or multiple reference signal resources of a first cell.

In one embodiment, any reference signal resource set in the first reference signal resource pool comprises at least one reference signal resource of a second cell.

In one subembodiment of the embodiment, the second cell is different from the first cell.

In one subembodiment of the embodiment, the second cell and the first cell have different Physical Cell Identities (PCIs).

In one embodiment, the phrase that the first MAC CE is used to indicate the first BFR comprises: the first MAC CE is used to indicate an occurrence of beam failure.

In one embodiment, the phrase that the first MAC CE is used to indicate the first BFR comprises: the first MAC CE is used to indicate an occurrence of beam failure associated with the first reference signal resource pool.

In one embodiment, the phrase that the first MAC CE is used to indicate the first BFR comprises: the first MAC CE is used to indicate an occurrence of beam failure for the first cell.

In one embodiment, the phrase that the first MAC CE is used to indicate the first BFR comprises: the first MAC CE is used to indicate beam failure for the first reference signal resource set associated with multiple reference signal resource sets in the first reference signal resource pool.

In one embodiment, the phrase that the first MAC CE is used to indicate the first BFR comprises: the first MAC CE is used to indicate an occurrence of beam failure for a TRP in the first cell.

In one embodiment, the phrase that a first parameter set is used to determine an order of the first MAC CE in the logical channel prioritization comprises: an order of the first MAC CE in the logical channel prioritization is related to the first parameter set.

In one embodiment, the phrase that a first parameter set is used to determine an order of the first MAC CE in the logical channel prioritization comprises: determining an order of the first MAC CE in the logical channel prioritization based on the first parameter set.

In one embodiment, the phrase that a first parameter set is used to determine an order of the first MAC CE in the logical channel prioritization comprises: the first parameter set directly determines an order of the first MAC CE in the logical channel prioritization.

In one embodiment, the phrase that a first parameter set is used to determine an order of the first MAC CE in the logical channel prioritization comprises: indirectly determining an order of the first MAC CE in the logical channel prioritization based on information in the first parameter set.

In one embodiment, the phrase that the first parameter set comprises a number of reference signal resource set(s) comprised in the first reference signal resource pool comprises: the first parameter set is related to a number of reference signal resource set(s) comprised in the first reference signal resource pool.

In one embodiment, the phrase that the first parameter set comprises a number of reference signal resource set(s) comprised in the first reference signal resource pool comprises: a number of the reference signal resource set(s) comprised in the first reference signal resource pool is used to determine the first parameter set.

In one embodiment, the phrase that the first parameter set comprises a number of reference signal resource set(s) comprised in the first reference signal resource pool comprises: the first parameter set comprises that the first reference signal resource pool is associated with a BFR or the reference signal resource set comprised in the first reference signal resource pool is associated with a BFR.

In one subembodiment of the embodiment, when the first reference signal resource pool is associated with a BFR, the number of reference signal resource set(s) comprised in the first reference signal resource pool is 1.

In one subembodiment of the embodiment, when the reference signal resource set comprised in the first reference signal resource pool is associated with a BFR, the number of reference signal resource sets comprised in the first reference signal resource pool is greater than 1.

for a BFR for the first cell, a number of reference signal resource set(s) comprised in the first reference signal resource pool is 1.

In one embodiment, the phrase that the number of the reference signal resource set(s) comprised in the first reference signal resource pool is 1 comprises: when the first BFR comprises a BFR associated with the first reference signal resource pool.

In one embodiment, the phrase that the number of the reference signal resource set(s) comprised in the first reference signal resource pool is 1 comprises: when the first BFR comprises a BFR for the first cell.

In one embodiment, the phrase that the number of the reference signal resource set(s) comprised in the first reference signal resource pool is 1 comprises: when the first BFR comprises an occurrence of beam failure in the first cell.

In one embodiment, the phrase that the number of the reference signal resource set(s) comprised in the first reference signal resource pool is 1 comprises: when the BFR process is for the first cell.

In one embodiment, the first reference signal resource pool when the number of the reference signal resource set(s) comprised in the first reference signal resource pool is 1, all reference signal resources in all reference signal resource sets in the first reference signal resource pool are used to determine beam failure of the first cell.

In one embodiment, the phrase that the order of the first MAC CE in the logical channel prioritization is a first order comprises: an order of the first MAC CE performing the logical channel prioritization according to the first order.

In one embodiment, the phrase that the order of the first MAC CE in the logical channel prioritization is a first order comprises: determining the order of the first MAC CE in the logical channel prioritization according to the first order.

In one embodiment, the order in the logical channel prioritization comprises: a priority of a logical channel is higher than a priority of another logical channel located after the logical channel.

In one embodiment, the order in the logical channel prioritization comprises: a priority of a logical channel is lower than a priority of another logical channel located after the logical channel.

In one embodiment, the order in the logical channel prioritization comprises: multiple logical channels are sorted in a descending order of priority.

In one embodiment, the order in the logical channel prioritization comprises: there exist two logical channels in multiple logical channels with a same logical channel prioritization order.

In one embodiment, an order of the logical channel prioritization of a logical channel other than the first MAC CE comprises:
  a C-RNTI MAC CE or data from UL-CCCH;
  a Configured Grant Confirmation MAC CE or a Multiple Entry Configured Grant Confirmation MAC CE;
  a Sidelink Configured Grant Confirmation MAC CE;
  an LBT failure MAC CE;
  a MAC CE for SL-BSR prioritized;
  a MAC CE of a BSR other than BSR comprising padding;
  a Single Entry PHR MAC CE or a Multiple Entry PHR MAC CE;
  a MAC CE of the number of Desired Guard Symbols;
  a MAC CE for Pre-emptive BSR;
  a MAC CE of an SL-BSR other than SL-BSR prioritized and SL-BSR comprising padding;
  any logical channel data other than a UL-CCCH;
  a MAC CE of recommended bit rate query;
  a MAC CE comprising padding BSR;
  a MAC CE comprising padding SL-BSR;

In one embodiment, the first order comprises: after at least one of the C-RNTI MAC CE or data from UL-CCCH.

In one embodiment, the first order comprises: being the same as at least one of the Configured Grant Confirmation MAC CE or the Multiple Entry Configured Grant Confirmation MAC CE.

In one subembodiment of the embodiment, a prioritization order of the Configured Grant Confirmation MAC CE or the first MAC CE or the Multiple Entry Configured Grant Confirmation MAC CE is decided by the UE implementation.

In one subembodiment of the embodiment, a prioritization order of the Configured Grant Confirmation MAC CE or the first MAC CE or the Multiple Entry Configured Grant Confirmation MAC CE is determined according to the service delay.

In one embodiment, the first order comprises: after at least one of the Configured Grant Confirmation MAC CE, or the Multiple Entry Configured Grant Confirmation MAC CE.

In one embodiment, the first order comprises: after at least one of the C-RNTI MAC CE or data from UL-CCCH, and before the Sidelink Configured Grant Confirmation MAC CE.

In one embodiment, the first order comprises: after at least one of the C-RNTI MAC CE or data from UL-CCCH, and before at least one of the Sidelink Configured Grant Confirmation MAC CE, the LBT failure MAC CE, or a MAC CE of the prioritized SL-BSR, or a MAC CE of a BSR other than a BSR comprising padding, or the Single Entry PHR MAC CE, or the Multiple Entry PHR MAC CE, or the MAC CE of the number of Desired Guard symbols, or a MAC CE of the pre-emptive BSR.

In one embodiment, the second order comprises: after at least one of the C-RNTI MAC CE or data from UL-CCCH.

In one embodiment, the second order comprises: after at least one of the Configured Grant Confirmation MAC CE, the BFR MAC CE, or the Multiple Entry Configured Grant Confirmation MAC CE.

In one embodiment, the second order comprises: after at least one of the Configured Grant Confirmation MAC CE, the BFR MAC CE, or the Multiple Entry Configured Grant Confirmation MAC CE, and before the Sidelink Configured Grant Confirmation MAC CE.

In one embodiment, the second order comprises: after the Sidelink Configured Grant Confirmation MAC CE and before the LBT failure MAC CE.

In one embodiment, the second order comprises: after the LBT failure MAC CE and before a MAC CE of the prioritized SL-BSR.

In one embodiment, the second order comprises: after a MAC CE of the prioritized SL-BSR and before a MAC CE of a BSR other than a BSR comprising padding.

In one embodiment, the second order comprises: after a MAC CE of a BSR other than a BSR comprising padding, and before the Single Entry PHR MAC CE or the Multiple Entry PHR MAC CE.

In one embodiment, the second order comprises: after the single entry PHR MAC CE or the Multiple Entry PHR MAC CE, and before a MAC CE of the number of desired guard symbols.

In one embodiment, the second order comprises: after a MAC CE of the number of desired guard symbols and before a MAC CE of the pre-emptive BSR.

In one embodiment, the phrase that the number of the reference signal resource sets comprised in the first reference signal resource pool is greater than 1 comprises: when the first BFR comprises a BFR for the first reference signal resource set in multiple reference signal resource sets associated with the first reference signal resource pool.

In one embodiment, the phrase that the number of the reference signal resource sets comprised in the first reference signal resource pool is greater than 1 comprises: when the first BFR comprises a BFR for a TRP in the first cell.

In one embodiment, the phrase that the number of the reference signal resource sets comprised in the first reference signal resource pool is greater than 1 comprises: when the first BFR comprises an occurrence of beam failure in a TRP in the first cell.

In one embodiment, the phrase that the number of the reference signal resource sets comprised in the first reference signal resource pool is greater than 1 comprises: when the BFR process is for a TRP in the first cell.

In one embodiment, when a number of reference signal resource sets comprised in the first reference signal resource pool is greater than 1, all reference signal resources in a reference signal resource set in the first reference signal resource pool are used to determine an occurrence of beam failure of a TRP, and reference signal resources other than the reference signal resource set in the first reference signal resource pool are not used to determine beam failure of the TRP.

In one embodiment, the phrase that the order of the first MAC CE in the logical channel prioritization is an order in a first candidate order set comprises: an order of the first MAC CE for the logical channel prioritization according to an order in the first candidate order set.

In one embodiment, the phrase that the order of the first MAC CE in the logical channel prioritization is an order in a first candidate order set comprises: determining the order of the first MAC CE in the logical channel prioritization according to the order in the first candidate order set.

In one embodiment, the phrase that the first candidate order set comprises at least two second orders comprises: the first candidate order set only comprises a candidate order; the first candidate order set is the second order.

In one embodiment, the phrase that the first candidate order set comprises at least two second orders comprises: the first candidate order set comprises multiple candidate orders; the second order is one of multiple candidate orders in the first candidate order set.

In one embodiment, when a number of reference signal resource sets comprised in the first reference signal resource pool is greater than 1, the order of the first MAC CE in the logical channel prioritization is the second order.

In one embodiment, the first candidate order set comprises the first order.

In one embodiment, the first candidate order set only comprises the second order.

In one embodiment, the phrase that the first order is higher than the second order comprises: a priority corresponding to the first order is higher than a priority corresponding to the second order.

In one embodiment, the phrase that the first order is higher than the second order comprises: order of the logical channel prioritization is sorted in descending order, with the first order being before the second order.

In one embodiment, the first order is different from the second order.

Embodiment 2

Figure 2:
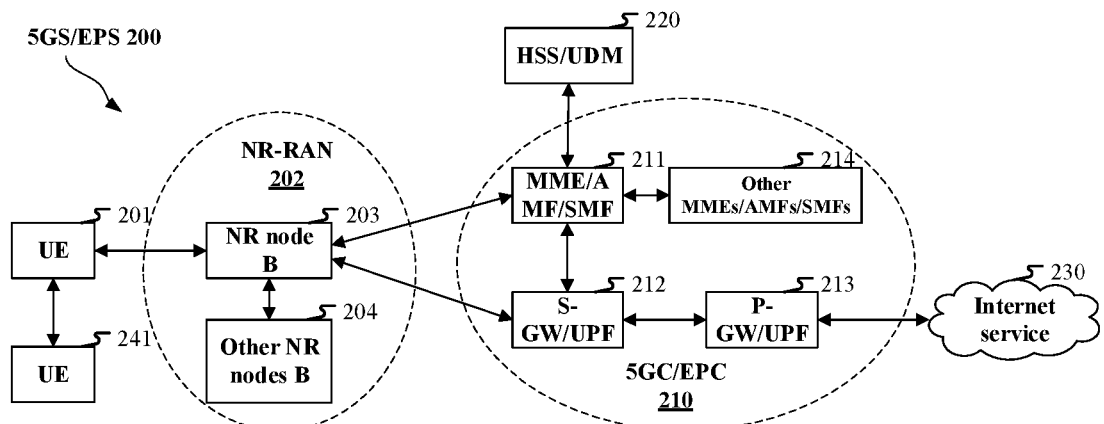
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address assignment and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 is a UE.

In one embodiment, the gNB 203 corresponds to the second node in the present application.

In one embodiment, the gNB 203 is a BaseStation (BS).

In one embodiment, the gNB 203 is a UE.

In one embodiment, the gNB 203 is a relay.

In one embodiment, the gNB 203 is a gateway.

In one embodiment, the UE supports Terrestrial Network (NTN) transmission.

In one embodiment, the UE supports Non-Terrestrial Network (NTN) transmission.

In one embodiment, the UE supports communications within networks with large latency differences.

In one embodiment, the UE supports Dual Connection (DC) transmission.

In one embodiment, the UE comprises an aircraft.

In one embodiment, the UE comprises a vehicle terminal.

In one embodiment, the UE comprises a vessel.

In one embodiment, the UE comprises an Internet of Things (IoT) terminal.

In one embodiment, the UE comprises an industrial Internet of Things (IoT) terminal.

In one embodiment, the UE comprises a device supporting transmission with low-latency and high-reliability.

In one embodiment, the UE comprises test equipment.

In one embodiment, the UE comprises a signaling tester.

In one embodiment, the base station supports transmission over a non-terrestrial network.

In one embodiment, the base station supports transmission over networks with large latency differences.

In one embodiment, the base station supports transmission over a terrestrial network.

In one embodiment, the base station comprises a Marco Cellular base station.

In one embodiment, the base station comprises a Micro Cell base station.

In one embodiment, the base station comprises a Pico Cell base station.

In one embodiment, the base station comprises a Femtocell.

In one embodiment, the base station comprises a base station supporting large latency differences.

In one embodiment, the base station comprises flight platform equipment.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling tester.

In one embodiment, the base station comprises an Integrated Access and Backhaul (IAB)-node.

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises an L3 relay.

In one embodiment, the relay comprises an L2 relay.

In one embodiment, the relay comprises a router.

In one embodiment, the relay comprises a switcher.

In one embodiment, the relay comprises a UE.

In one embodiment, the relay comprises a base station.

Embodiment 3

Figure 3:
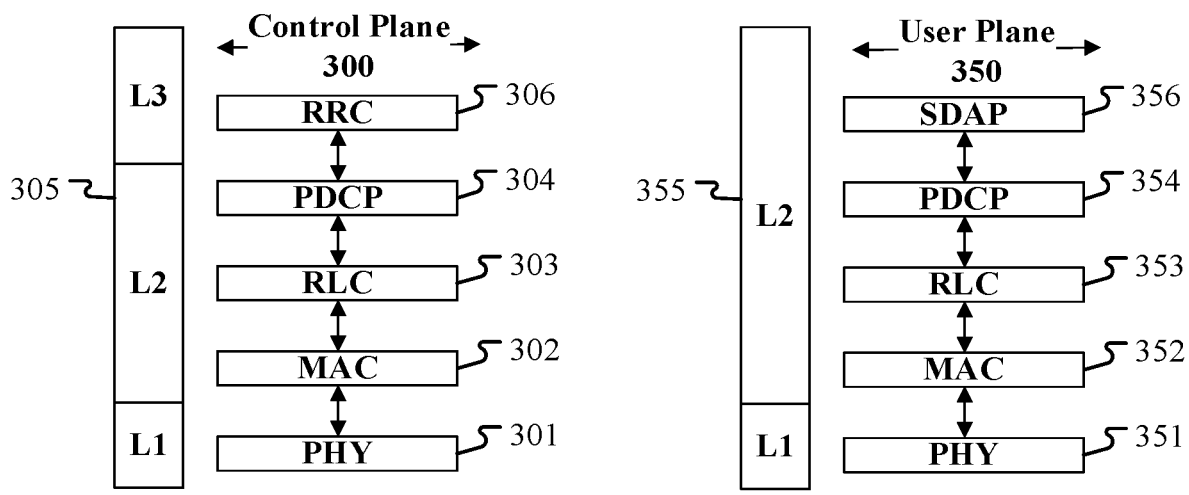
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present application. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the first signaling in the present application is generated by the MAC 302 or the MAC 352.

In one embodiment, the first signaling in the present application is generated by the PHY 301 or the PHY 351.

In one embodiment, each reference signal resource set in the first reference signal resource pool in the present application is generated by the PHY301 or the PHY351.

In one embodiment, the first MAC PDU comprising the first MAC CE in the present application is generated by the RRC306.

In one embodiment, the first MAC PDU comprising the first MAC CE in the present application is generated by the PDCP 304 or the PDCP 354.

In one embodiment, the first MAC PDU comprising the first MAC CE in the present application is generated by the RLC 303 or the RLC 353.

In one embodiment, the first MAC PDU comprising the first MAC CE in the present application is generated by the MAC 302 or the MAC 352.

In one embodiment, the first MAC PDU comprising the first MAC CE in the present application is generated by the PHY 301 or the PHY 351.

In one embodiment, the second signaling in the present application is generated by the RRC 306.

In one embodiment, the second signaling in the present application is generated by the MAC 302 or the MAC 352.

In one embodiment, the second signaling in the present application is generated by the PHY 301 or the PHY 351.

Embodiment 4

Figure 4:
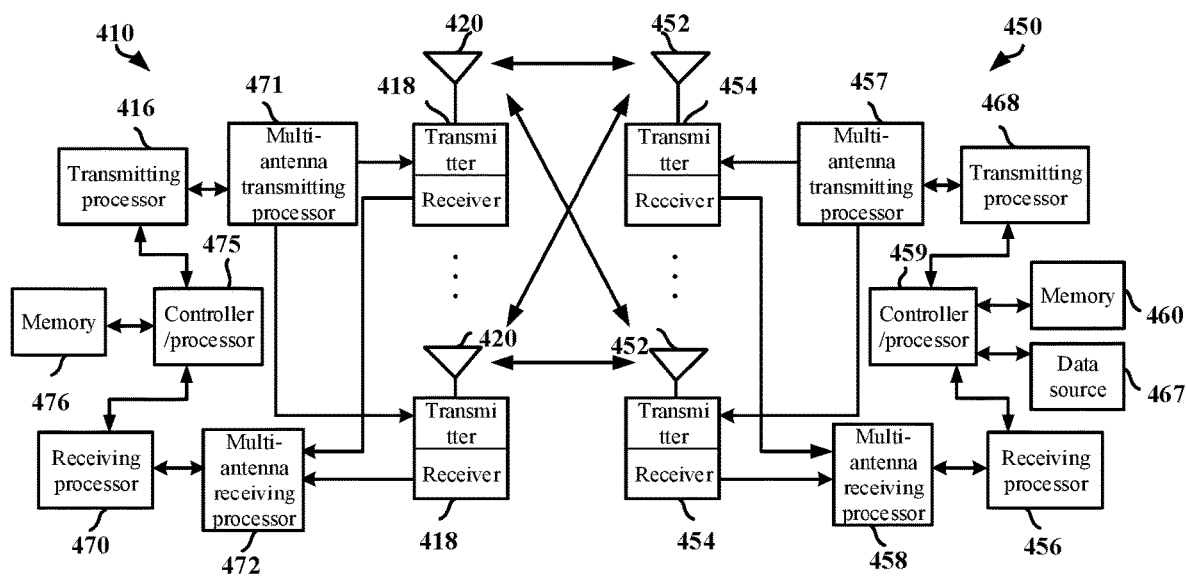
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources assignment for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources assignment so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least: receives a first signaling, the first signaling configures a first reference signal resource pool, the first reference signal resource pool comprises at least one reference signal resource set; receives each reference signal resource set in the first reference signal resource pool, a measurement performed on a first reference signal resource set is used to trigger a first BFR, the first reference signal resource set is a reference signal resource set in the first reference signal resource pool; determines a resource assignment of a first uplink grant according to logical channel prioritization; when the first uplink grant can accommodate a first MAC CE, transmits a first MAC PDU comprising the first MAC CE on resources of the first uplink grant; herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the first communication device 450 comprises at least one processor and at least one memory. a memory that stores a computer readable instruction program. The computer readable instruction program generates an action when executed by at least one processor. The action includes: receiving a first signaling, the first signaling configuring a first reference signal resource pool, the first reference signal resource pool comprising at least one reference signal resource set; receiving each reference signal resource set in the first reference signal resource pool, a measurement performed on a first reference signal resource set being used to trigger a first BFR, the first reference signal resource set being a reference signal resource set in the first reference signal resource pool; determining a resource assignment of a first uplink grant according to logical channel prioritization; when the first uplink grant can accommodate a first MAC CE, transmitting a first MAC PDU comprising the first MAC CE on resources of the first uplink grant; herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling, the first signaling configures a first reference signal resource pool, the first reference signal resource pool comprises at least one reference signal resource set; transmits each reference signal resource set in the first reference signal resource pool, a measurement performed on a first reference signal resource set is used to trigger a first BFR, the first reference signal resource set is a reference signal resource set in the first reference signal resource pool; resource assignment of a first uplink grant is determined based on logical channel prioritization; receives a first MAC PDU comprising a first MAC CE; when the first uplink grant can accommodate the first MAC CE, the first MAC PDU comprising the first MAC CE is transmitted on resources of the first uplink grant; herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the second communication device 410 comprises a memory that stores a computer readable instruction program. The computer readable instruction program generates an action when executed by at least one processor. The action includes: transmitting a first signaling, the first signaling configuring a first reference signal resource pool, the first reference signal resource pool comprising at least one reference signal resource set; transmitting all reference signal resources in each reference signal resource set in the first reference signal resource pool, a measurement performed on a first reference signal resource set being used to trigger a first BFR, the first reference signal resource set being a reference signal resource set in the first reference signal resource pool; the resource assignment of a first uplink grant being determined based on logical channel prioritization; receiving a first MAC PDU comprising a first MAC CE; when the first uplink grant can accommodate the first MAC CE, the first MAC PDU comprising the first MAC CE being transmitted on resources of the first uplink grant; herein, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the antenna 452, the receiver 454, the receiving processor 456, the controller/processor 459 are used to receive a first signaling; at least one of the antenna 420, the transmitter 418, the transmitting processor 416, or the controller/processor 475 is used to transmit the first signaling.

In one embodiment, the antenna 452, the receiver 454, the receiving processor 456, and the controller/processor 459 are used to receive each reference signal resource set in a first reference signal resource pool; at least one of the antenna 420, the transmitter 418, the transmitting processor 416, or the controller/processor 475 is used to each reference signal resource set in a first reference signal resource pool.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the transmitter 454, the transmitting processor 468, and the controller/processor 459 are used to transmit a first MAC PDU comprising a first MAC CE; at least one of the antenna 420, the receiver 418, the receiving processor 470, or the controller/processor 475 is used to receive a first MAC PDU comprising a first MAC CE.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a UE that supports large delay differences.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTN.

In one embodiment, the second communication device 410 is satellite equipment.

In one embodiment, the second communication device 410 is flying platform equipment.

In one embodiment, the second communication device 410 is a base station that supports TN.

Embodiment 5

Figure 5:
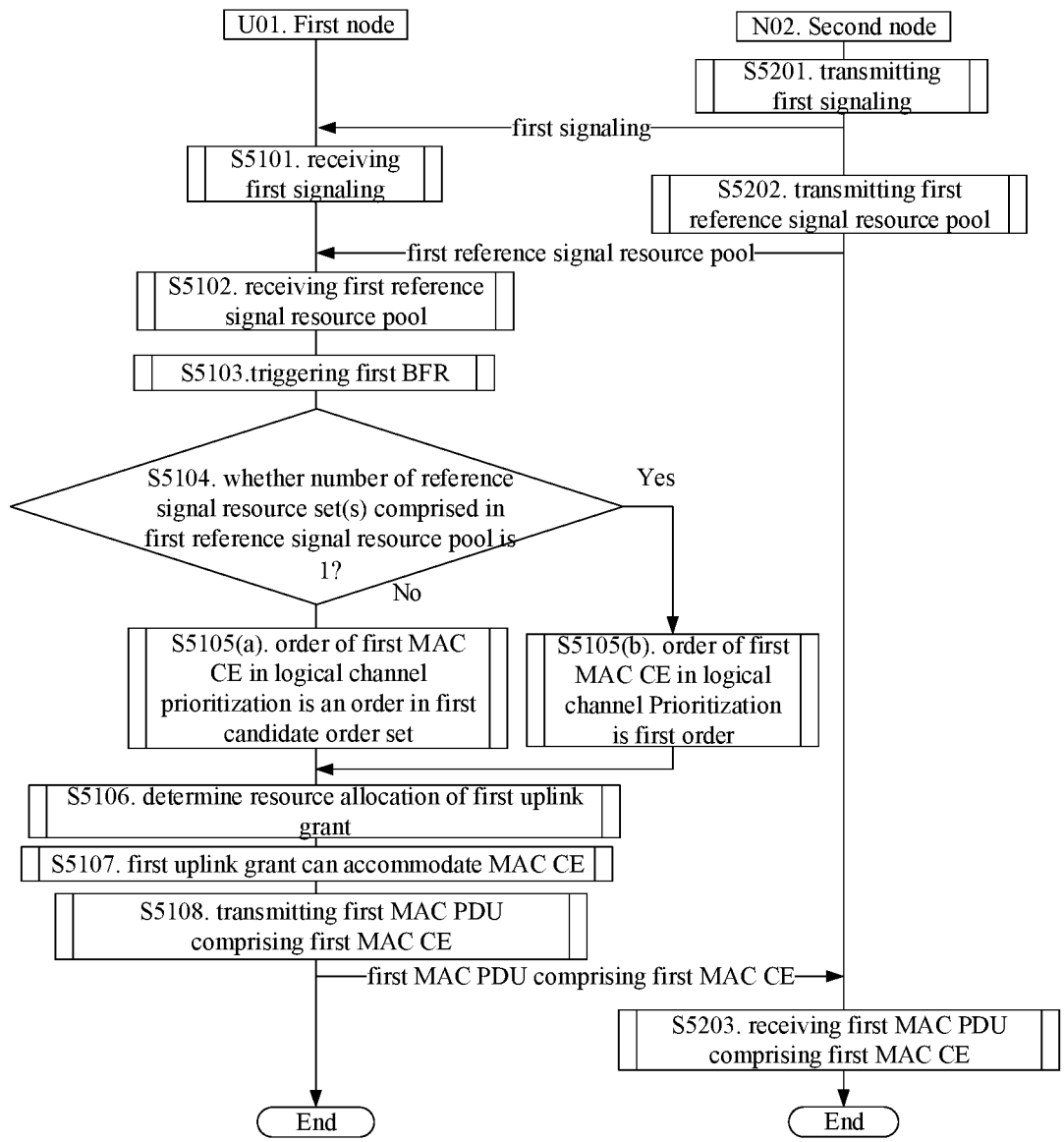
FIG. 5 illustrates a flowchart of radio signal transmission according to one embodiment of the present application.

Embodiment 5 illustrates a flowchart of radio signal transmission according to one embodiment in the present application, as shown in FIG. 5. It is particularly underlined that the order illustrated in the embodiment does not put constraints over sequences of signal transmissions and implementations.

The first node U01 receives a first signaling in step S5101; in step S5102, receives each reference signal resource set in the first reference signal resource pool; in step S5103, a measurement performed on a first reference signal resource set is used to trigger a first BFR; in step S5104, judges whether a number of reference signal resource set(s) comprised in a first reference signal resource pool is 1, when the number of the reference signal resource set(s) comprised in the first reference signal resource pool is 1, goes to step S5105 (b), when the number of reference signal resource sets comprised in the first reference signal resource pool is greater than 1, goes to step S5105 (a); in step S5105(b), the order of the first MAC CE in the logical channel prioritization is a first order; in step S5105(a), the order of the first MAC CE in the logical channel prioritization is an order in a first candidate order set; in step S5106, determines a resource assignment of a first uplink grant according to logical channel prioritization; in step S5107, determines that the first uplink grant can accommodate a first MAC CE; in step S5108, when the first uplink grant can accommodate a first MAC CE, transmits a first MAC PDU comprising the first MAC CE on resources of the first uplink grant.

The second node N02 transmits the first signaling in step S5201; in step S5202, transmits each reference signal resource set in the first reference signal resource pool; in step S5203, receives the first MAC PDU comprising the first MAC CE.

In embodiment 5, the first signaling configures a first reference signal resource pool, the first reference signal resource pool comprises at least one reference signal resource set; the first reference signal resource set is a reference signal resource set in the first reference signal resource pool; any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; the first candidate order set comprises at least a second order; the first order is higher than the second order.

Figure 6:
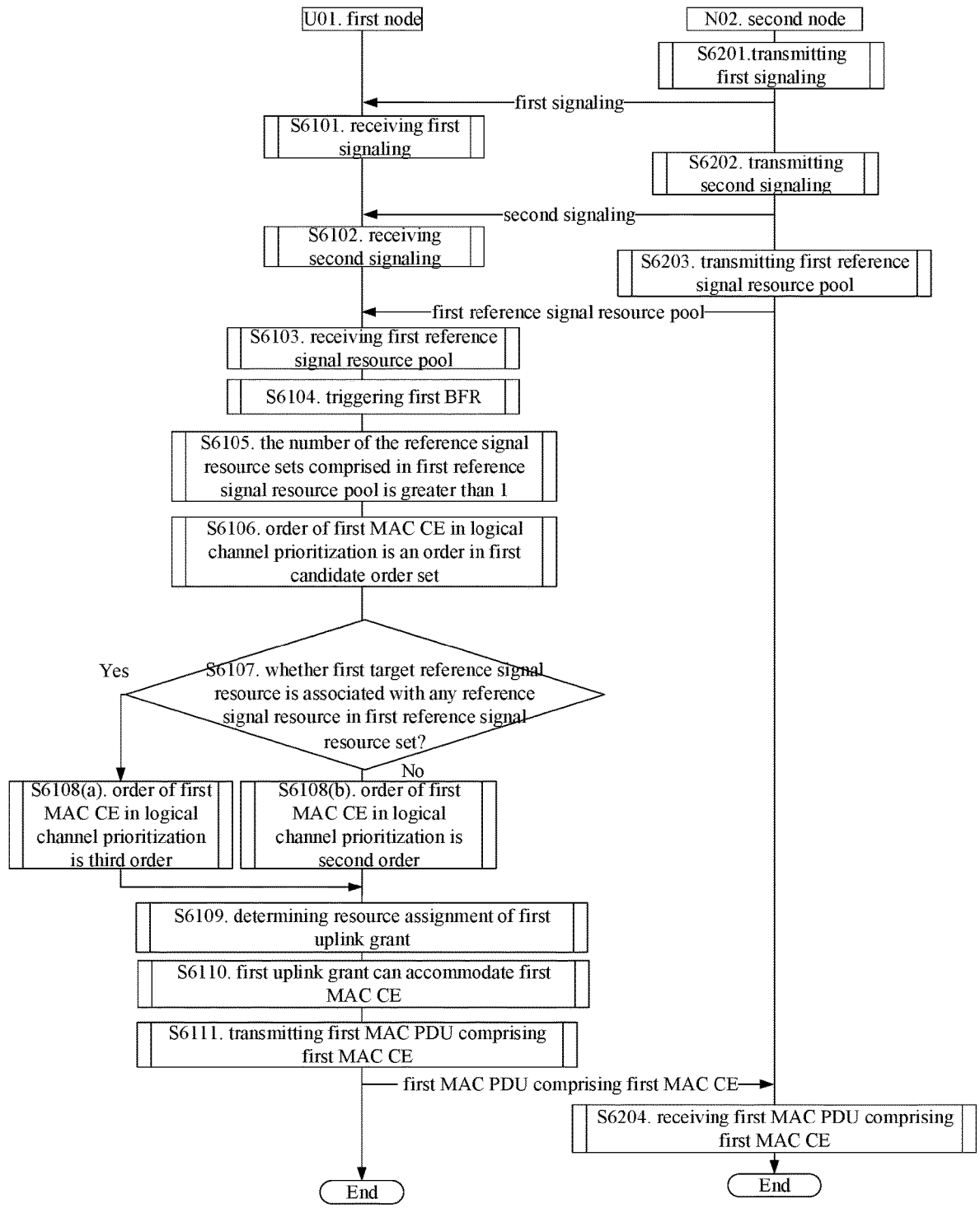
FIG. 6 illustrates a flowchart of radio signal transmission according to another embodiment of the present application.
Figure 7:
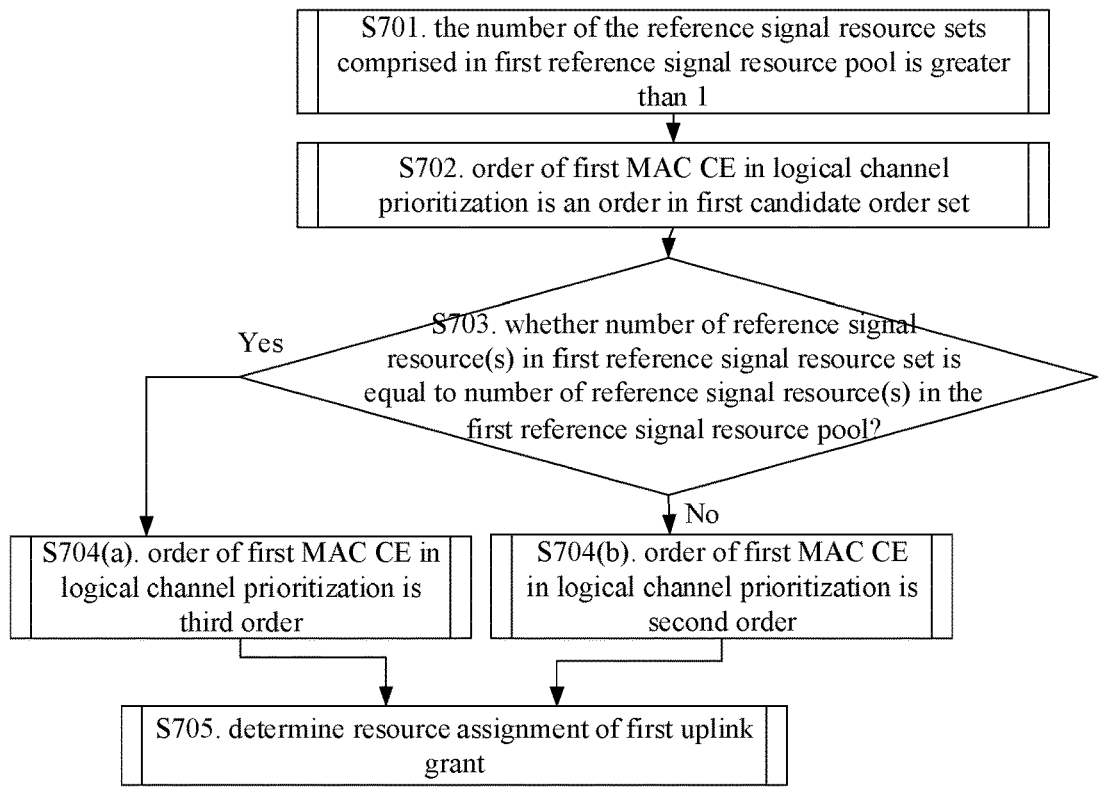
FIG. 7 illustrates a schematic diagram of whether a number of reference signal resource(s) in a first reference signal resource set is equal to a number of reference signal resource(s) in a first reference signal resource pool being used to determine an order of a first MAC CE in logical channel prioritization according to one embodiment of the present application.

In one embodiment, when the number of reference signal resource set(s) comprised in the first reference signal resource pool is 1, a format of a first MAC CE refers to FIG. 6.1.3.23-1 in section 6.1.3.23 of 3GPP TS38.321.

In one embodiment, when the number of reference signal resource set(s) comprised in the first reference signal resource pool is 1, a format of a first MAC CE refers to FIG. 6.1.3.23-2 in section 6.1.3.23 of 3GPP TS38.321.

In one embodiment, when the number of reference signal resource sets comprised in the first reference signal resource pool is greater than 1, the first MAC CE comprises a first identity, and the first identity is associated with the first reference signal resource set.

In one subembodiment of the embodiment, the first identity is used to indicate a TRP in the first cell.

In one subembodiment of the above embodiment, the first identity comprises a TRP identity.

In one subembodiment of the embodiment, the phrase that the first identity is associated with the first reference signal resource set comprises: the first identity is an identity of the first reference signal resource set.

In one subembodiment of the embodiment, the phrase that the first identity is associated with the first reference signal resource set comprises: the first identity corresponds to the first reference signal resource set.

In one subembodiment of the embodiment, the phrase that the first identity is associated with the first reference signal resource set comprises: the first identity is used to determine the first reference signal resource set.

In one subembodiment of the embodiment, the phrase that the first identity is associated with the first reference signal resource set comprises: the first identity is associated with a TRP, and the first reference signal resource set is associated with the TRP.

In one subembodiment of the above embodiment, the first identity is associated with a COntrol REsource SET (CORE-SET).

In one subembodiment of the above embodiment, the first identity comprises CORESET Identity (ID).

In one subembodiment of the above embodiment, the first identity indicates a TRP associated with the first reference signal resource set.

In one subembodiment of the embodiment, the first identity comprises a non-negative integer.

In one subembodiment of the above embodiment, the first identity comprises 4 bits.

In one subembodiment of the above embodiment, the first identity comprises 6 bits.

In one subembodiment of the above embodiment, the first identity comprises a bitmap.

In one subsidiary embodiment of the subembodiment, each bit in the bitmap corresponds to a TRP.

In one subsidiary embodiment of the subembodiment, one bit in the bitmap being set to 1 indicates that beam failure occurs in a TRP corresponding to the bit; one bit in the bitmap being set to 0 indicates that beam failure does not occur in a TRP corresponding to the bit.

In one subsidiary embodiment of the above embodiment, a length of the bitmap is equal to 2.

In one subsidiary embodiment of the above embodiment, a length of the bitmap is equal to 4.

In one subsidiary embodiment of the above embodiment, a length of the bitmap is equal to 6.

In one subsidiary embodiment of the above embodiment, a length of the bitmap is equal to 8.

In one embodiment, the first signaling indicates the order of the first MAC CE in the logical channel prioritization from the first candidate order set.

In one embodiment, the order of the first MAC CE in the logical channel prioritization is associated with the first reference signal resource set.

In one embodiment, the phrase that the first signaling indicates the order of the first MAC CE in the logical channel prioritization from the first candidate order set comprises: an IE in the first signaling indicates the order of the first MAC CE in the logical channel prioritization from the first candidate order set.

In one subembodiment of the above embodiment, a name of the IE comprises BeamFailureRecoveryConfig.

In one subembodiment of the above embodiment, a name of the IE comprises BeamFailureRecoverySCellConfig.

In one subembodiment of the embodiment, a name of the IE comprises BWP-DownlinkDedicated.

In one subembodiment of the embodiment, a name of the IE comprises BWP-Downlink.

In one subembodiment of the embodiment, a name of the IE comprises ServingCellConfig.

In one subembodiment of the embodiment, a name of the IE comprises BWP-UplinkDedicated.

In one subembodiment of the embodiment, a name of the IE comprises RACH-ConfigCommon.

In one subembodiment of the embodiment, a name of the IE comprises at least one of Beam, or Failure, or Recovery, or Config, or TRP, or Link, or Entity.

In one embodiment, the phrase that the first signaling indicates the order of the first MAC CE in the logical channel prioritization from the first candidate order set comprises: a field in the first signaling indicates the order of the first MAC CE in the logical channel prioritization from the first candidate order set.

In one subembodiment of the embodiment, the first field explicitly indicates the order of the first MAC CE in the logical channel prioritization from the first candidate order set.

In one subembodiment of the embodiment, the first field implicitly indicates the order of the first MAC CE in the logical channel prioritization from the first candidate order set.

In one subsidiary embodiment of the subembodiment, the first field indicates the number of reference signal resource set(s) comprised in the first reference signal resource pool, and determines the order of the first MAC CE in the logical channel prioritization based on the number of reference signal resource set(s) comprised in the first reference signal resource pool.

In one subsidiary embodiment of the subembodiment, the first field indicates a BFR for the first cell or a BFR for a TRP in the first cell, and determines the order of the first MAC CE in the logical channel prioritization based on a BFR for the first cell or a BFR for a TRP in the first cell.

In one subembodiment of the embodiment, the order of the first MAC CE in the logical channel prioritization is determined based on whether the first field is set.

In one subsidiary embodiment of the subembodiment, the first field is set to determine that the order of the first MAC CE in the logical channel prioritization is the third order; the first field is not set to determine that the order of the first MAC CE in the logical channel prioritization is the second order.

In one subsidiary embodiment of the subembodiment, the first field is set to determine that the order of the first MAC CE in the logical channel prioritization is the second order; the first field is not set to determine that the order of the first MAC CE in the logical channel prioritization is the third order.

In one subembodiment of the embodiment, the order of the first MAC CE in the logical channel prioritization is indicated according to the first field as the second order or the third order.

In one embodiment, the number of the reference signal resource sets comprised in the first reference signal resource pool is greater than 1, the first candidate order set comprises a third order, and the third order is different from the second order.

In one embodiment, the phrase that the first candidate order set comprises a third order comprises: the third order is a candidate order in the first candidate order set.

In one embodiment, the phrase that the first candidate order set comprises a third order comprises: the first candidate order set at least comprises the second order and the third order.

In one embodiment, the phrase that the first candidate order set comprises a third order comprises: the first candidate order set only comprises the second order and the third order.

In one embodiment, the phrase that the third order is different from the second order comprises: the third order is the first order.

In one embodiment, the phrase that the third order is different from the second order comprises: the third order is lower than the second order.

In one embodiment, the phrase that the third order is different from the second order comprises: the third order is higher than the second order.

In one embodiment, when the number of reference signal resource sets comprised in the first reference signal resource pool is greater than 1, the order of the first MAC CE in the logical channel prioritization is an order in a first candidate order set, and the first candidate order set comprises the third order.

In one embodiment, when the number of reference signal resource sets comprised in the first reference signal resource pool is greater than 1, the order of the first MAC CE in the logical channel prioritization is an order in a first candidate order set, and the first candidate order set comprises the second order or the third order.

In one embodiment, when a number of reference signal resource sets comprised in the first reference signal resource pool is greater than 1, the order of the first MAC CE in the logical channel prioritization is the third order.

In one embodiment, when the number of reference signal resource sets comprised in the first reference signal resource pool is greater than 1, the order of the first MAC CE in the logical channel prioritization is the second order or the third order.

In one embodiment, when the number of reference signal resource sets comprised in the first reference signal resource pool is greater than 1, the order of the first MAC CE in the logical channel prioritization is related to whether the first target reference signal resource in the present application is associated with any reference signal resource in the first reference signal resource set.

In one embodiment, the third order comprises: after at least one of the C-RNTI MAC CE or data from UL-CCCH.

In one embodiment, the third order comprises: being the same as at least one of the Configured Grant Confirmation MAC CE, the BFR MAC CE, or the Multiple Entry Configured Grant Confirmation MAC CE.

In one embodiment, the third order comprises: after at least one of the Configured Grant Confirmation MAC CE, the BFR MAC CE, or the Multiple Entry Configured Grant Confirmation MAC CE.

In one embodiment, the third order comprises: after at least one of the C-RNTI MAC CE or data from UL-CCCH, and before the Sidelink Configured Grant Confirmation MAC CE.

In one embodiment, the third order comprises: before at least one of the Configured Grant Confirmation MAC CE, the BFR MAC CE, or the Multiple Entry Configured Grant Confirmation MAC CE.

In one embodiment, the third order is before the second order.

In one embodiment, the second order comprises: after at least one of the Configured Grant Confirmation MAC CE, the BFR MAC CE, or the Multiple Entry Configured Grant Confirmation MAC CE; the third order comprises: being the same as at least one of the Configured Grant Confirmation MAC CE, the BFR MAC CE, or the Multiple Entry Configured Grant Confirmation MAC CE.

In one embodiment, the second order comprises: after the LBT failure MAC CE and before the MAC CE of the prioritized SL-BSR; the third order comprises: being the same as at least one of the Configured Grant Confirmation MAC CE, the BFR MAC CE, or the Multiple Entry Configured Grant Confirmation MAC CE.

In one embodiment, the second order comprises: after the Sidelink Configured Grant Confirmation MAC CE and before the LBT failure MAC CE; the third order comprises: being the same as at least one of the Configured Grant Confirmation MAC CE, a BFR MAC CE, or the Multiple Entry Configured Grant Confirmation MAC CE.

In one embodiment, after at least one of the Configured Grant Confirmation MAC CE, the BFR MAC CE, or the Multiple Entry Configured Grant Confirmation MAC CE; the third order comprises: before the order of at least one of the Configured Grant Confirmation MAC CE, the BFR MAC CE, or the Multiple Entry Configured Grant Confirmation MAC CE.

In one embodiment, the second order comprises: being the same as at least one of the Configured Grant Confirmation MAC CE, the BFR MAC CE, or the Multiple Entry Configured Grant Confirmation MAC CE; the third order comprises: before the order of at least one of the Configured Grant Confirmation MAC CE, the BFR MAC CE, or the Multiple Entry Configured Grant Confirmation MAC CE.

In one embodiment, the number of the reference signal resource sets comprised in the first reference signal resource pool is greater than 1, the first candidate order set comprises a third order, and the third order is different from the second order; the first signaling indicates the order of the first MAC CE in the logical channel prioritization from the first candidate order set.

Embodiment 6

Embodiment 6 illustrates a flowchart of radio signal transmission according to another embodiment of the present application, as shown in FIG. 6. It is particularly underlined that the order illustrated in the embodiment does not put constraints over sequences of signal transmissions and implementations.

The first node U01 receives a first signaling in step S6101; receives a second signaling in step S6102; in step S6103, receives each reference signal resource set in the first reference signal resource pool; in step S6104, a measurement performed on a first reference signal resource set is used to trigger a first BFR; in step S6105, judges whether a number of reference signal resource set(s) comprised in a first reference signal resource pool is 1, when the number of the reference signal resource set(s) comprised in the first reference signal resource pool is 1, goes to step S6106(b), when the number of reference signal resource sets comprised in the first reference signal resource pool is greater than 1, goes to step S6106 (a); in step S6106(b), the order of the first MAC CE in the logical channel prioritization is a first order; in step S6106(a), the order of the first MAC CE in the logical channel prioritization is an order in a first candidate order set; in step S6107, judges whether a first target reference signal resource is associated with any reference signal resource in the first reference signal resource set, if the first target reference signal resource is associated with any reference signal resource in the first reference signal resource set, goes to step S6108 (a), if the first target reference signal resource is not associated with any reference signal resource in the first reference signal resource set, goes to step S6108 (b); in step S6108(a), the order of the first MAC CE in the logical channel prioritization is the third order; in step S6108(b), the order of the first MAC CE in the logical channel prioritization is the second order; in step S6109, determines a resource assignment of a first uplink grant according to logical channel prioritization; in step S6110, determines that the first uplink grant can accommodate a first MAC CE; in step S6111, when the first uplink grant can accommodate a first MAC CE, transmits a first MAC PDU comprising the first MAC CE on resources of the first uplink grant.

The second node N02 transmits the first signaling in step S6201; in step S6202, transmits the second signaling; in step S6203, transmits each reference signal resource set in the first reference signal resource pool; in step S6204, receives the first MAC PDU comprising the first MAC CE.

In embodiment 6, the first signaling configures a first reference signal resource pool, the first reference signal resource pool comprises at least one reference signal resource set; the first reference signal resource set is a reference signal resource set in the first reference signal resource pool; any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; the first candidate order set comprises at least a second order; the first order is higher than the second order; the second signaling is used to indicate a first target reference signal resource, and the first parameter set comprises whether the first target reference signal resource is associated with any reference signal resource in the first reference signal resource set.

In one embodiment, the second signaling is transmitted via an air interface.

In one embodiment, the second signaling is transmitted via an antenna port.

In one embodiment, the second signaling comprises a downlink signaling.

In one embodiment, the second signaling comprises all or part of a higher-layer signaling.

In one embodiment, the second signaling comprises an RRC message.

In one subembodiment of the embodiment, a name of the RRC message comprises RRCReconfiguration.

In one subembodiment of the embodiment, the RRC message comprises an SIB1 message.

In one embodiment, the second signaling comprises one or multiple IEs in an RRC message.

In one subembodiment of the embodiment, a name of the IE comprises BWP-DownlinkDedicated.

In one subembodiment of the embodiment, a name of the IE comprises BWP-Downlink.

In one subembodiment of the embodiment, a name of the IE comprises ServingCellConfig.

In one subembodiment of the embodiment, a name of the IE comprises CellGroupConfig.

In one subembodiment of the above embodiment, a name of the IE comprises BeamFailureRecoverySCellConfig.

In one subembodiment of the above embodiment, a name of the IE comprises BeamFailureRecoveryConfig.

In one subembodiment of the above embodiment, the IE carries the first identity.

In one embodiment, the second signaling comprises a field in an RRC message.

In one subembodiment of the above embodiment, a name of the field comprises candidateBeamRSList.

In one subembodiment of the above embodiment, a name of the field comprises candidateBeamRSSCellList.

In one subembodiment of the above embodiment, a name of the field comprises candidateBeamRS.

In one subembodiment of the above embodiment, a name of the field comprises candidateBeamConfig.

In one subembodiment of the above embodiment, a name of the field comprises ssb.

In one subembodiment of the above embodiment, a name of the field comprises csi-RS.

In one subembodiment of the above embodiment, the field carries the first identity.

In one embodiment, the second signaling comprises a MAC layer signaling.

In one embodiment, the second signaling comprises a MAC PDU.

In one embodiment, the second signaling comprises a MAC RAR.

In one embodiment, the second signaling comprises a PDCCH.

In one embodiment, the second signaling comprises a physical-layer signaling.

In one embodiment, the second signaling comprises a DCI.

In one embodiment, the second signaling is a physical-layer signaling.

In one embodiment, the second signaling indicates the first uplink grant.

In one embodiment, the phrase that the second signaling is used to indicate a first target reference signal resource comprises: one or multiple IEs in the second signaling indicate the first target reference signal resource.

In one embodiment, the phrase that the second signaling is used to indicate a first target reference signal resource comprises: one or multiple fields in the second signaling indicate the first target reference signal resource.

In one embodiment, the phrase that the second signaling is used to indicate a first target reference signal resource comprises: the second signaling explicitly indicates the first target reference signal resource.

In one embodiment, the phrase that the second signaling is used to indicate a first target reference signal resource comprises: the second signaling implicitly indicates the first target reference signal resource.

In one embodiment, the first target reference signal resource is associated with a DCI, the DCI indicates a TRP, and different values of DCIs correspond to different TRPs.

In one embodiment, the first target reference signal resource is associated with a DCI, and different TRPs of the first cell correspond to a same DCI.

In one embodiment, the first target reference signal resource is an uplink reference signal resource, and the second signaling explicitly indicates the first target reference signal resource.

In one subembodiment of the above embodiment, an antennaPort field in the second signaling indicates the first target reference signal resource.

In one subembodiment of the above embodiment, an srs-ResourceIndicator field in the second signaling indicates the first target reference signal resource.

In one subembodiment of the above embodiment, an sri-PUSCH-MappingToAddModList field in the second signaling indicates the first target reference signal resource.

In one subembodiment of the above embodiment, an sri-PUSCH-PathlossReferenceRS-Id field in the second signaling indicates the first target reference signal resource.

In one subembodiment of the above embodiment, a TCI-State field in the second signaling indicates the first target reference signal resource.

In one subembodiment of the above embodiment, if a spatial downlink reception parameter of a reference signal resource in the first reference signal resource set is used to determine a spatial uplink transmission parameter of the first target reference signal resource, the first target reference signal resource is associated with the reference signal resource in the first reference signal resource set.

In one embodiment, the first target reference signal resource is a downlink reference signal resource, and the second signaling implicitly indicates the first target reference signal resource.

In one subembodiment of the above embodiment, the first target reference signal resource is a Demodulation Reference Signal (DMRS) of the second signaling.

In one subembodiment of the above embodiment, the first target reference signal resource comprises a CSI-RS resource that is Quasi-Co-Located (QCL) with a DMRS of the second signaling.

In one subembodiment of the above embodiment, the first target reference signal resource comprises an SSB that is QCL with a DMRS of the second signaling.

In one subembodiment of the above embodiment, if a reference signal resources in the first reference signal resource set is QCL with the first target reference signal resource, the first target reference signal resource is associated with the reference signal resource in the first reference signal resource set.

In one embodiment, whether the first target reference signal resource is associated with any reference signal resource in the first reference signal resource set is used to determine an order of the first MAC CE in the logical channel prioritization.

In one embodiment, the phrase that the first parameter set comprises whether the first target reference signal resource is associated with any reference signal resource in the first reference signal resource set comprises: whether the first target reference signal resource is associated with any reference signal resource in the first reference signal resource set is a parameter in the first parameter set.

In one embodiment, the phrase that the first parameter set comprises whether the first target reference signal resource is associated with any reference signal resource in the first reference signal resource set comprises: a parameter in the first parameter set is determined based on whether the first target reference signal resource is associated with any reference signal resource in the first reference signal resource set.

In one embodiment, the first target reference signal resource is associated with the first uplink grant.

In one embodiment, the first target reference signal resource is used to determine an antenna port of the first uplink grant.

In one embodiment, the first target reference signal resource is used to determine a beam corresponding of the first uplink grant.

In one embodiment, the first target reference signal resource is a reference signal resource corresponding to resources of the first uplink grant.

In one embodiment, the first target reference signal resource is the same as a reference signal resource in the first reference signal resource set, the first target reference signal resource comprises an antenna port, and a reference signal resource in the first reference signal resource set comprises an antenna port.

In one embodiment, one or multiple antenna ports corresponding to the first uplink grant is the same as antenna ports corresponding to one or multiple reference signal resources in the first reference signal resource set.

In one embodiment, a TRP corresponding to the first uplink grant is the same as a TRP corresponding to the first reference signal resource set.

In one embodiment, the first target reference signal resource is associated with one or multiple beams.

In one embodiment, the first target reference signal resource is associated with one or multiple TRPs.

In one embodiment, the first target reference signal resource is associated with a cell.

In one embodiment, the phrase that if the first target reference signal resource is associated with any reference signal resource in the first reference signal resource set comprises: when the first target reference signal resource is associated with any reference signal resource in the first reference signal resource set.

In one embodiment, the phrase that if the first target reference signal resource is associated with any reference signal resource in the first reference signal resource set comprises: if the first target reference signal resource is associated with a TRP corresponding to the first reference signal resource set.

In one embodiment, the phrase that if the first target reference signal resource is associated with any reference signal resource in the first reference signal resource set comprises: if the first target reference signal resource is associated with a TRP where beam failure occurs.

In one embodiment, the third order is the first order.

In one embodiment, the phrase that if the first target reference signal resource is not associated with any reference signal resource in the first reference signal resource set comprises: when the first target reference signal resource is not associated with any reference signal resource in the first reference signal resource set.

In one embodiment, the phrase that if the first target reference signal resource is not associated with any reference signal resource in the first reference signal resource set comprises: if the first target reference signal resource is not associated with a TRP corresponding to the first reference signal resource set.

In one embodiment, the phrase that if the first target reference signal resource is not associated with any reference signal resource in the first reference signal resource set comprises: if the first target reference signal resource is not associated with a TRP where beam failure occurs.

In one embodiment, the number of the reference signal resource sets comprised in the first reference signal resource pool is greater than 1, the first candidate order set comprises a third order, and the third order is different from the second order.

In one embodiment, the first signaling indicates the order of the first MAC CE in the logical channel prioritization from the first candidate order set.

In one embodiment, the number of the reference signal resource sets comprised in the first reference signal resource pool is greater than 1, the first candidate order set comprises a third order, and the third order is different from the second order; the first signaling indicates the order of the first MAC CE in the logical channel prioritization from the first candidate order set.

Embodiment 7

Embodiment 7 illustrates a schematic diagram of whether a number of reference signal resource(s) in a first reference signal resource set is equal to a number of reference signal resource(s) in a first reference signal resource pool being used to determine an order of a first MAC CE in logical channel prioritization according to one embodiment of the present application.

In embodiment 7, in step S701, the number of reference signal resource sets comprised in the first reference signal resource pool is greater than 1; in step S702, the order of the first MAC CE in the logical channel prioritization is an order in a first candidate order set; in step S703, judge whether a number of reference signal resource(s) in the first reference signal resource set is equal to a number of reference signal resource(s) in the first reference signal resource pool, if yes, go to step S704 (a), if not, go to step S704 (b); in step S704(a), the order of the first MAC CE in the logical channel prioritization is the third order; in step S704(b), the order of the first MAC CE in the logical channel prioritization is the second order; in step S705, determine a resource assignment of a first uplink grant according to logical channel prioritization; herein, the first candidate order set comprises a third order, and the third order is different from the second order; the first parameter set comprises that whether a number of reference signal resource(s) in the first reference signal resource set is equal to a number of reference signal resource(s) in the first reference signal resource pool.

In one embodiment, the number of the reference signal resource sets comprised in the first reference signal resource pool is greater than 1, the first candidate order set comprises a third order, and the third order is different from the second order; the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

In one embodiment, whether a number of reference signal resource(s) in the first reference signal resource set is equal to a number of reference signal resource(s) in the first reference signal resource pool is used to determine an order of the first MAC CE in the logical channel prioritization.

In one embodiment, the phrase that whether a number of reference signal resource(s) in the first reference signal resource set is equal to a number of reference signal resource(s) in the first reference signal resource pool comprises: whether a number of reference signal resource(s) in the first reference signal resource set is equal to a number of reference signal resource(s) in the first reference signal resource pool is a parameter in the first parameter set.

In one embodiment, the phrase that whether a number of reference signal resource(s) in the first reference signal resource set is equal to a number of reference signal resource(s) in the first reference signal resource pool comprises: a parameter in the first parameter set is determined according to whether a number of reference signal resource(s) in the first reference signal resource set is equal to a number of reference signal resource(s) in the first reference signal resource pool.

In one embodiment, the phrase that whether a number of reference signal resource(s) is equal to a number of reference signal resource(s) in the first reference signal resource pool comprises: whether the first reference signal resource pool only comprises the first reference signal resource set.

In one subembodiment of the embodiment, when the first reference signal resource pool only comprises the first reference signal resource set, the order of the first MAC CE in the logical channel prioritization is the third order.

In one subembodiment of the embodiment, when the first reference signal resource pool also comprises a reference signal resource set other than the first reference signal resource set in addition to the first reference signal resource set, the order of the first MAC CE in the logical channel prioritization is the second order.

In one embodiment, the phrase that whether a number of reference signal resource(s) is equal to a number of reference signal resource(s) in the first reference signal resource pool comprises: whether the first reference signal resource pool only comprises one reference signal resource set.

In one subembodiment of the embodiment, when the first reference signal resource pool only comprises one reference signal resource set, the order of the first MAC CE in the logical channel prioritization is the third order.

In one subembodiment of the embodiment, when the first reference signal resource pool comprises more than one reference signal resource set, the order of the first MAC CE in the logical channel prioritization is the second order.

In one embodiment, the phrase that whether a number of reference signal resource(s) is equal to a number of reference signal resource(s) in the first reference signal resource pool comprises: whether the first BFR is associated with the first cell or is associated with a TRP in the first cell.

In one subembodiment of the embodiment, when the first BFR is associated with the first cell, the order of the first MAC CE in the logical channel prioritization is the third order.

In one subembodiment of the embodiment, when the first BFR is associated with a TRP in the first cell, the order of the first MAC CE in the logical channel prioritization is the second order.

In one embodiment, when a number of reference signal resource(s) in the first reference signal resource set is equal to a number of reference signal resource(s) in the first reference signal resource pool, the order of the first MAC CE in the logical channel prioritization is the third order.

In one embodiment, when a number of reference signal resource(s) in the first reference signal resource set is not equal to a number of reference signal resource(s) in the first reference signal resource pool, the order of the first MAC CE in the logical channel prioritization is the second order.

Embodiment 8

Figure 8:
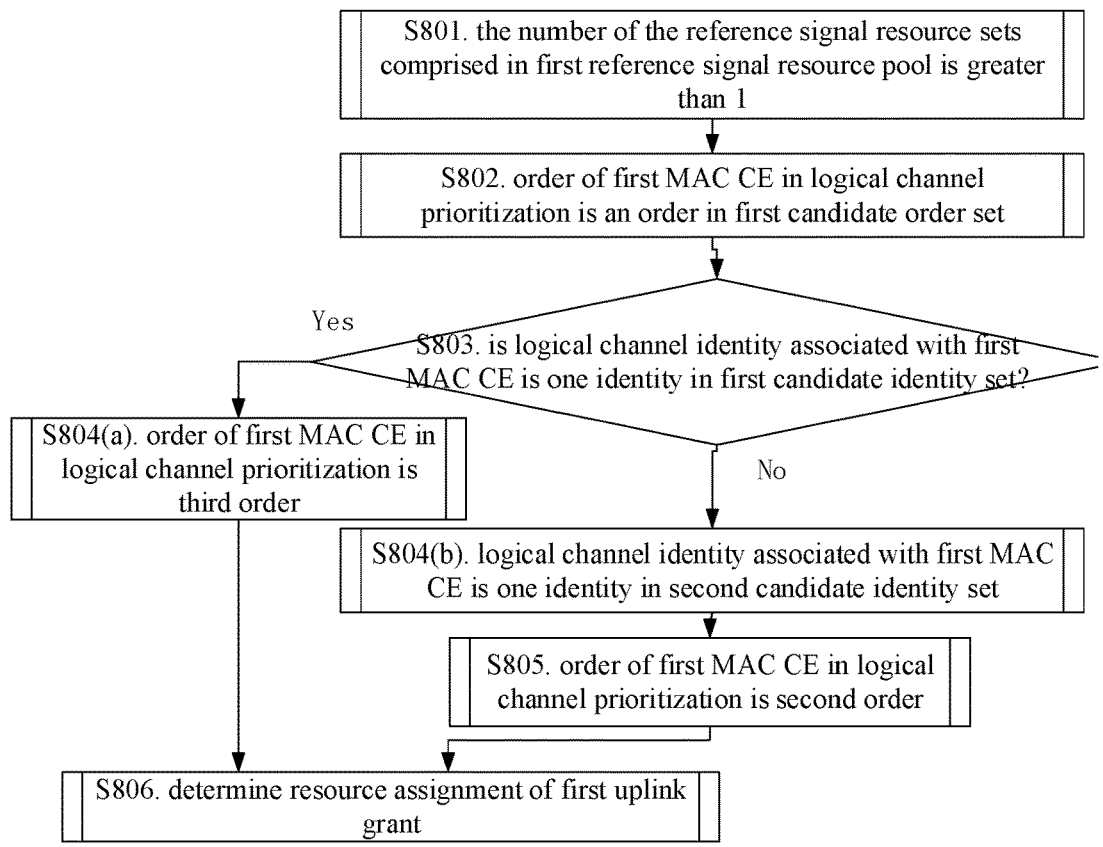
FIG. 8 illustrates a schematic diagram of a logical channel identity associated with a first MAC CE is used to determine an order of a first MAC CE in logical channel prioritization according to one embodiment of the present application.

Embodiment 8 illustrates a schematic diagram of a logical channel identity associated with a first MAC CE is used to determine an order of a first MAC CE in logical channel prioritization according to one embodiment of the present application, as shown in FIG. 8.

In embodiment 8, in step S801, the number of reference signal resource sets comprised in the first reference signal resource pool is greater than 1; in step S802, the order of the first MAC CE in the logical channel prioritization is an order in a first candidate order set; in step S803, judge whether the logical channel identity associated with a first MAC CE is one identity in a first candidate identity set, if the logical channel identity associated with the first MAC CE is one identity in the first candidate identity set, go to step S804 (*a*); otherwise, go to step S804 (*b*); in step S804(*a*), the order of the first MAC CE in the logical channel prioritization is the third order; in step S804(*b*), determine that the logical channel identity associated with the first MAC CE is one identity in the second candidate identity set; in step S805, the order of the first MAC CE in the logical channel prioritization is the second order; in step S806, determine a resource assignment of a first uplink grant according to logical channel prioritization; herein, the first candidate order set comprises a third order, and the third order is different from the second order; the first parameter set comprises a logical channel identity associated with the first MAC CE; the first candidate identity set comprises at least one logical channel identity; the second candidate identity set comprises at least one logical channel identity.

In one embodiment, the number of the reference signal resource sets comprised in the first reference signal resource pool is greater than 1, the first candidate order set comprises a third order, and the third order is different from the second order; the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

In one embodiment, the logical channel identity associated with the first MAC CE is one identity in the first candidate identity set or the logical channel identity associated with the first MAC CE is one identity in the second candidate identity set is used to determine an order of the first MAC CE in the logical channel prioritization.

In one embodiment, the phrase that the first parameter set comprises a logical channel identity associated with the first MAC CE comprises: the first parameter set is related to a logical channel identity associated with the first MAC CE.

In one embodiment, the phrase that the first parameter set comprises a logical channel identity associated with the first MAC CE comprises: a logical channel identity associated with the first MAC CE is used to determine the first parameter set.

In one embodiment, the phrase that if the logical channel identity associated with the first MAC CE is one in the first candidate identity set comprises: when the logical channel identity associated with the first MAC CE is one identity in the first candidate identity set.

In one embodiment, the phrase that if the logical channel identity associated with the first MAC CE is one identity in a first candidate identity set comprises: if the logical channel identity associated with the first MAC CE belongs to the first candidate identity set.

In one embodiment, the third order is the first order.

In one embodiment, a logical channel identity is associated with a code-point.

In one embodiment, a logical channel identity is associated with an index.

In one embodiment, a logical channel identity comprises a Logical Channel Identity (LCID).

In one embodiment, a logical channel identity comprises an Enhanced Logical Channel Identity (eLCID).

In one embodiment, a logical channel identity comprises a non-negative integer.

In one embodiment, a code-point or index number associated with a logical channel identity is not greater than 63.

In one embodiment, a code-point associated with a logical channel identity is not greater than 255.

In one embodiment, an index number associated with a logical channel identity is not greater than 319.

In one embodiment, the first candidate identity set comprises an LCID with a code-point or index number equal to 50.

In one embodiment, the first candidate identity set comprises an LCID with a code-point or index number equal to 51.

In one embodiment, the first candidate identity set comprises an eLCID with a code-point or index number equal to 250.

In one embodiment, the first candidate identity set comprises an eLCID with a code-point or index number equal to 251.

In one embodiment, a code-point or index number associated with a logical channel identity in the first candidate identity set is not less than 35 and not greater than 44.

In one embodiment, any logical channel identity in the first candidate identity set comprises an LCID.

In one embodiment, any logical channel identity in the first candidate identity set comprises an eLCID.

In one embodiment, any logical channel identity in the first candidate identity set comprises a BFR (a byte Ci).

In one embodiment, any logical channel identity in the first candidate identity set comprises a truncated BFR (a byte Ci).

In one embodiment, any logical channel identity in the first candidate identity set comprises a BFR (four bytes Ci).

In one embodiment, any logical channel identity in the first candidate identity set comprises a truncated BFR (four bytes Ci).

In one embodiment, the phrase that if the logical channel identity associated with the first MAC CE is one identity in the second candidate identity set comprises: when the logical channel identity associated with the first MAC CE is one identity in the second candidate identity set.

In one embodiment, the phrase that if the logical channel identity associated with the first MAC CE is one identity in the second candidate identity set comprises: if the logical channel identity associated with the first MAC CE belongs to the second candidate identity set.

In one embodiment, any logical channel identity in the first candidate identity set is used to indicate a BFR of a cell.

In one embodiment, a code-point or index number associated with any logical channel identity in the second candidate identity set is not less than 35 and not greater than 44.

In one embodiment, a code-point or index number associated with any logical channel identity in the second candidate identity set is not less than 1 and not greater than 32.

In one embodiment, a code-point associated with any logical channel identity in the second candidate identity set is not less than 0 and not greater than 249.

In one embodiment, an index number associated with any logical channel identity in the second candidate identity set is not less than 64 and not greater than 313.

In one embodiment, a code-point or index number associated with any logical channel identity in the second candidate identity set comprises 43.

In one embodiment, a code-point or index number associated with any logical channel identity in the second candidate identity set comprises 44.

In one embodiment, a code-point associated with any logical channel identity in the second candidate identity set comprises 248.

In one embodiment, a code-point associated with any logical channel identity in the second candidate identity set comprises 249.

In one embodiment, an index number associated with any logical channel identity in the second candidate identity set comprises 313.

In one embodiment, an index number associated with any logical channel identity in the second candidate identity set comprises 312.

In one embodiment, any logical channel identity in the second candidate identity set comprises an LCID.

In one embodiment, any logical channel identity in the second candidate identity set comprises an eLCID.

In one embodiment, any logical channel identity in the second candidate identity set is used to indicate a BFR of one or multiple TRPs.

Embodiment 9

Figure 9:
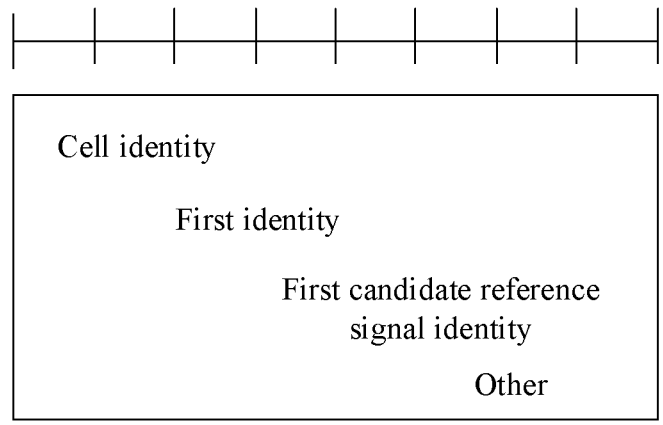
FIG. 9 illustrates a schematic diagram of a format of a first MAC CE when the number of the reference signal resource sets comprised in the first reference signal resource pool is greater than 1 according to one embodiment of the present application.

Embodiment 9 illustrates a schematic diagram of a format of a first MAC CE when the number of the reference signal resource sets comprised in the first reference signal resource pool is greater than 1 according to one embodiment of the present application, as shown in FIG. 9.

In embodiment 9, when the number of reference signal resource sets comprised in the first reference signal resource pool is greater than 1, a first MAC CE comprises at least one of a cell identity field, a first identity field, a first candidate reference signal identity field, or other fields; the cell identity field indicates the cell identity, the first identity field indicates a reference signal resource set in the first reference signal resource pool, and the first candidate reference signal identity field indicates a candidate reference signal resource.

In one embodiment, the cell identity is used to indicate the first cell.

In one embodiment, the cell identity is used to indicatethat a cell is a PCell or PSCell.

In one subembodiment of the above embodiment, the cell identity comprises 1 bit.

In one subembodiment of the embodiment, the cell identity being set as 1 represents that the cell is a PCell.

In one subembodiment of the embodiment, the cell identity being set as 0 represents that the cell is a PSCell.

In one embodiment, the cell identity comprises a PCI.

In one embodiment, the cell identity comprises one of servingCellId, PhysCellId, ScellIndex, or ServCellIndex.

In one embodiment, the cell identity comprises a bit bitmap, and a bit in the bitmap being set to 1 represents that beam failure is detected in a cell indicated by the bit; one bit in the bitmap being set to 0 represents that beam failure is not detected in a cell indicated by the bit.

In one subembodiment of the above embodiment, the bit bitmap comprises 7 bits.

In one subembodiment of the above embodiment, the bit bitmap comprises 31 bits.

In one embodiment, the first candidate reference signal identity is set as an index of an SSB, and SS-RSRP of the SSB is higher than a threshold, and the threshold is configured through an RRC signaling.

In one embodiment, the first candidate reference signal identity is set as an index of a CSI-RS, and CSI-RSRP of the CSO-RS is greater than a threshold, and the threshold is configured through an RRC signaling.

In one embodiment, the threshold comprises rsrp-ThresholdBFR.

In one embodiment, the threshold comprises a sum of rsrp-ThresholdBFR and a first offset, and a unit for measurement of the first offset is the same as a unit for measurement of the rsrp-ThresholdBFR.

In one embodiment, the index of the SSB or the index of the CSI-RS is a positive integer.

In one embodiment, K1 positive integer(s) from 0 to K1-1 is (are respectively) used to index K1 candidate reference signal(s), K1 being a positive integer, and the index of the SSB or the index of the CSI-RS is one of the K1 positive integer(s).

In one embodiment, K1 positive integer(s) from 1 to K1 is (are respectively) used to index K1 candidate reference signal(s), K1 being a positive integer, and the index of SSB or the index of the CSI-RS is one of the K1 positive integer(s).

In one embodiment, the K1 candidate reference signal(s) is(are) indicated through an RRC signaling.

In one embodiment, the K1 candidate reference signal(s) is(are) indicated by a field in an RRC signaling, and a name of the field comprises at least one of candidate, or Beam, or RS, or List, or BFR, or Config, or TRP, or Link, or SSB, or CSI-RS, or Entity.

In one embodiment, the K1 candidate reference signal(s) is(are) indicated by a field in an RRC signaling, and a name of the field comprises candidateBeamRSSCellList.

In one embodiment, the K1 candidate reference signal(s) is(are) indicated by a field in an RRC signaling, and a name of the field comprises candidateBeamRSList.

In one embodiment, the K1 candidate reference signal(s) is(are) indicated by a field in an RRC signaling, and a name of the field comprises PRACH-ResourceDedicatedBFR.

In one embodiment, the K1 candidate reference signal(s) is(are) indicated by a field in an RRC signaling, and a name of the field comprises CandidateBeamRS.

In one embodiment, the K1 candidate reference signal(s) is(are) indicated by a field in an RRC signaling, and a name of the field comprises candidateBeamConfig.

In one embodiment, the K1 candidate reference signal(s) is(are) indicated by a field in an RRC signaling, and a name of the field comprises ssb or csi-RS.

In one embodiment, a TRP with which a candidate reference signal indicated by the first candidate reference signal identity field in the first MAC CE is associated is the same as a TRP with which the first reference signal resource set is associated.

In one embodiment, a candidate reference signal indicated by the first candidate reference signal identity field in the first MAC CE and the first reference signal resource set are associated with a same TRP.

In one embodiment, both a candidate reference signal indicated by the first candidate reference signal identity field in the first MAC CE and the first reference signal resource set are associated with the first cell.

In one embodiment, a candidate reference signal indicated by the first candidate reference signal identity field in the first MAC CE is associated with a second cell, and the first reference signal resource set is associated with the first cell.

In one embodiment, a candidate reference signal indicated by the first candidate reference signal identity field in the first MAC CE is one of the K1 candidate reference signals.

In one embodiment, the first identity is implicitly indicated through the first candidate reference signal identity.

In one embodiment, the first identity is determined through the first candidate reference signal identity.

In one embodiment, one of the K1 candidate reference signal(s) is indexed to one of an SSB-Index, or an integer between 0 and 63, or NZP-CSI-RS-ResourceId.

In one embodiment, the other fields exist.

In one embodiment, the other fields do not exist.

In one embodiment, the other fields comprise at least one of a reserved bit or an AC field.

In one subembodiment of the above embodiment, the reserved bit comprises an R field, and the reserved bit is set to 0.

In one subembodiment of the above embodiment, the AC field indicates whether the first candidate reference signal identifier exists.

In one embodiment, a first MAC CE at least comprises the first identity field.

In one embodiment, a first MAC CE at least comprises the first identity field and the first candidate reference signal identity field.

Embodiment 10

Figure 10:
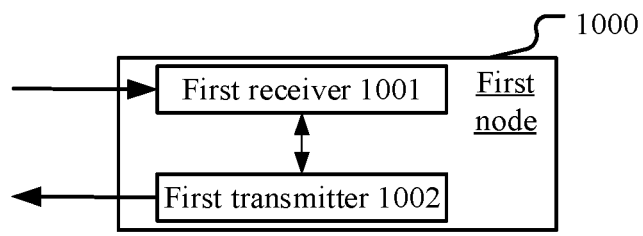
FIG. 10 illustrates a structure block diagram of a processor in a first node according to one embodiment of the present application.

Embodiment 10 illustrates a structure block diagram of a processor in a first node according to one embodiment of the present application, as shown in FIG. 10. In FIG. 10, a processor 1000 in a first node comprises a first receiver 1001 and a first transmitter 1002.

The first receiver 1001 receives a first signaling, the first signaling configures a first reference signal resource pool, the first reference signal resource pool comprises at least one reference signal resource set; receives each reference signal resource set in the first reference signal resource pool, a measurement performed on a first reference signal resource set is used to trigger a first BFR, the first reference signal resource set is a reference signal resource set in the first reference signal resource pool; determines a resource assignment of a first uplink grant according to logical channel prioritization;

the first transmitter 1002, when the first uplink grant can accommodate a first MAC CE, transmits a first MAC PDU comprising the first MAC CE on resources of the first uplink grant;

In embodiment 10, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the number of the reference signal resource sets comprised in the first reference signal resource pool is greater than 1, the first candidate order set comprises a third order, and the third order is different from the second order.

In one embodiment, the first signaling indicates the order of the first MAC CE in the logical channel prioritization from the first candidate order set.

In one embodiment, the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

In one embodiment, the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

In one embodiment, the first receiver 1001 receives a second signaling; herein, the second signaling is used to indicate a first target reference signal resource, and the first parameter set comprises whether the first target reference signal resource is associated with any reference signal resource in the first reference signal resource set; if the first target reference signal resource is associated with any reference signal resource in the first reference signal resource set, the order of the first MAC CE in the logical channel prioritization is the third order; if the first target reference signal resource is not associated with any reference signal resource in the first reference signal resource set, the order of the first MAC CE in the logical channel prioritization is the second order.

In one embodiment, when the number of the reference signal resource set(s) comprised in the first reference signal resource pool is 1, the first MAC CE comprises a first identity, and the first identity is associated with the first reference signal resource set.

In one embodiment, the first receiver 1001 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1001 comprises the antenna 452, the receiver 454, the multi-antenna receiving processor 458 and the receiving processor 456 in FIG. 4 of the present application.

In one embodiment, the first receiver 1001 comprises the antenna 452, the receiver 454 and the receiving processor 456 in FIG. 4 of the present application.

In one embodiment, the first transmitter 1002 comprises the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1002 comprises the antenna 452, the transmitter 454, the multi-antenna transmitting processor 457 and the transmitting processor 468 in FIG. 4 of the present application.

In one embodiment, the first transmitter 1002 comprises the antenna 452, the transmitter 454 and the transmitting processor 468 in FIG. 4 of the present application.

Embodiment 11

Figure 11:
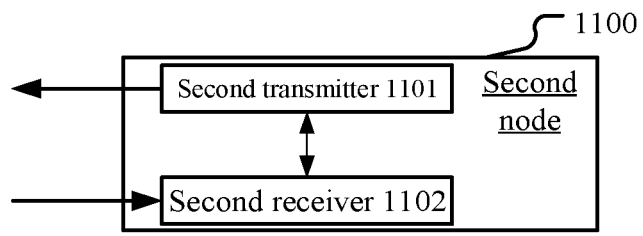
FIG. 11 illustrates a structure block diagram of a processor in a second node according to one embodiment of the present application.

Embodiment 11 illustrates a structure block diagram of a processor in a second node according to one embodiment of the present application, as shown in FIG. 11. In FIG. 11, a processor 1100 in a second node comprises a second transmitter 1101 and a second receiver 1102.

The second transmitter 1101 transmits a first signaling, the first signaling configures a first reference signal resource pool, the first reference signal resource pool comprises at least one reference signal resource set; transmits each reference signal resource set in the first reference signal resource pool, a measurement performed on a first reference signal resource set is used to trigger a first BFR, the first reference signal resource set is a reference signal resource set in the first reference signal resource pool; resource assignment of a first uplink grant is determined based on logical channel prioritization;

the second receiver 1102 receives a first MAC PDU comprising a first MAC CE; when the first uplink grant can accommodate the first MAC CE, the first MAC PDU comprising the first MAC CE is transmitted on resources of the first uplink grant;

In embodiment 11, any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

In one embodiment, the number of the reference signal resource sets comprised in the first reference signal resource pool is greater than 1, the first candidate order set comprises a third order, and the third order is different from the second order.

In one embodiment, the first signaling indicates the order of the first MAC CE in the logical channel prioritization from the first candidate order set.

In one embodiment, the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

In one embodiment, the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

In one embodiment, the second transmitter 1101 transmits a second signaling; herein, the second signaling is used to indicate a first target reference signal resource, and the first parameter set comprises whether the first target reference signal resource is associated with any reference signal resource in the first reference signal resource set; if the first target reference signal resource is associated with any reference signal resource in the first reference signal resource set, the order of the first MAC CE in the logical channel prioritization is the third order; if the first target reference signal resource is not associated with any reference signal resource in the first reference signal resource set, the order of the first MAC CE in the logical channel prioritization is the second order.

In one embodiment, when the number of the reference signal resource set(s) comprised in the first reference signal resource pool is 1, the first MAC CE comprises a first identity, and the first identity is associated with the first reference signal resource set.

In one embodiment, the second transmitter 1101 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1101 comprises the antenna 420, the transmitter 418, the multi-antenna transmitting processor 471 and the transmitting processor 416 in FIG. 4 of the present application.

In one embodiment, the second transmitter 1101 comprises the antenna 420, the transmitter 418 and the transmitting processor 416 in FIG. 4 of the present application.

In one embodiment, the second receiver 1102 comprises the antenna 420, the receiver 418, the multi-antenna receiving processor 472, the receiving processor 470, the controller/processor 475 and the memory 476 in FIG. 4 of the present application.

In one embodiment, the second receiver 1102 comprises the antenna 420, the receiver 418, the multi-antenna receiving processor 472 and the receiving processor 470 in FIG. 4 of the present application.

In one embodiment, the second receiver 1102 comprises the antenna 420, the receiver 418 and the receiving processor 470 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, tele-controlled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first receiver, receiving a first signaling, the first signaling configuring a first reference signal resource pool, the first reference signal resource pool comprising at least one reference signal resource set; monitoring all reference signal resources in each reference signal resource set in the first reference signal resource pool, a measurement performed on a first reference signal resource set being used to trigger a first BFR, the first reference signal resource set being a reference signal resource set in the first reference signal resource pool; determining a resource assignment of a first uplink grant according to logical channel prioritization; and
a first transmitter, when the first uplink grant can accommodate a first MAC CE, transmitting a first MAC PDU comprising the first MAC CE on resources of the first uplink grant;
wherein any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

2. The first node according to claim 1, wherein the number of the reference signal resource sets comprised in the first reference signal resource pool is greater than 1, the first candidate order set comprises a third order, and the third order is different from the second order.

3. The first node according to claim 2, wherein the phrase that the third order is different from the second order comprises: the third order is the first order; or, the third order is lower than the second order; or, the phrase that the third order is different from the second order comprises: the third order is higher than the second order.

4. The first node according to claim 2, wherein the first parameter set comprises whether a number of reference signal resource(s) in the first reference signal resource set is equal to a number of reference signal resource(s) in the first reference signal resource pool, if yes, the order of the first MAC CE in the logical channel prioritization is the third order, if not, the order of the first MAC CE in the logical channel prioritization is the second order.

5. The first node according to claim 2, wherein the first parameter set comprises a logical channel identity associated with the first MAC CE, if the logical channel identity associated with the first MAC CE is one identity in a first candidate identity set, the order of the first MAC CE in the logical channel prioritization is the third order, and the first candidate identity set comprises at least one logical channel identity; if the logical channel identity associated with the first MAC CE is one identity in a second candidate identity set, the order of the first MAC CE in the logical channel prioritization is the second order, and the second candidate identity set comprises at least one logical channel identity.

6. The first node according to claim 5, wherein a codepoint or index number associated with a logical channel identity in the first candidate identity set is not less than 35 and not greater than 44; an index number associated with any logical channel identity in the second candidate identity set is not less than 64 and not greater than 313.

7. The first node according to claim 2, comprising:
the first receiver, receiving a second signaling;
wherein the second signaling is used to indicate a first target reference signal resource, and the first parameter set comprises whether the first target reference signal resource is associated with any reference signal resource in the first reference signal resource set; if the first target reference signal resource is associated with any reference signal resource in the first reference signal resource set, the order of the first MAC CE in the logical channel prioritization is the third order; if the first target reference signal resource is not associated with any reference signal resource in the first reference signal resource set, the order of the first MAC CE in the logical channel prioritization is the second order.

8. The first node according to claim 1, wherein when the number of the reference signal resource set(s) comprised in the first reference signal resource pool is 1, the first MAC CE comprises a first identity, and the first identity is associated with the first reference signal resource set.

9. The first node according to claim 8, wherein when the number of reference signal resource sets comprised in the first reference signal resource pool is greater than 1, the first MAC CE comprises a first identity, and the first identity is associated with the first reference signal resource set.

10. The first node according to claim 8, wherein the first identity is an identity of the first reference signal resource set.

11. The first node according to claim 8, wherein the first identity comprises a bit bitmap.

12. The first node according to claim 8, wherein the first identity is implicitly indicated through a first candidate reference signal identity.

13. The first node according to claim 1, wherein the first BFR refers to a BFR of the first reference signal resource set associated with multiple reference signal resource sets in the first reference signal resource pool; the number of reference signal resource sets comprised in the first reference signal resource pool is greater than 1.

14. The first node according to claim 1, wherein the first signaling indicates the order of the first MAC CE in the logical channel prioritization from the first candidate order set.

15. The first node according to claim 1, wherein the first BFR refers to a BFR associated with the first reference signal resource set; the number of reference signal resource set(s) comprised in the first reference signal resource pool is 1.

16. The first node according to claim 1, wherein the first reference signal resource pool when the number of the reference signal resource set(s) comprised in the first reference signal resource pool is 1 is the same as the first reference signal resource pool when the number of the reference signal resource sets comprised in the first reference signal resource pool is greater than 1.

17. The first node according to claim 1, wherein the first reference signal resource pool when the number of the reference signal resource set(s) comprised in the first reference signal resource pool is 1 is different from the first reference signal resource pool when the number of the reference signal resource sets comprised in the first reference signal resource pool is greater than 1.

18. A second node for wireless communications, comprising:
a second transmitter, transmitting a first signaling, the first signaling configuring a first reference signal resource pool, the first reference signal resource pool comprising at least one reference signal resource set; transmitting all reference signal resources in each reference signal resource set in the first reference signal resource pool, a measurement performed on a first reference signal resource set being used to trigger a first BFR, the first reference signal resource set being a reference signal resource set in the first reference signal resource pool; the resource assignment of a first uplink grant being determined based on logical channel prioritization; and
a second receiver, receiving a first MAC PDU comprising a first MAC CE; when the first uplink grant can accommodate the first MAC CE, the first MAC PDU comprising the first MAC CE being transmitted on resources of the first uplink grant;
wherein any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

19. A method in a first node for wireless communications, comprising:

receiving a first signaling, the first signaling configuring a first reference signal resource pool, the first reference signal resource pool comprising at least one reference signal resource set; monitoring all reference signal resources in each reference signal resource set in the first reference signal resource pool, a measurement performed on a first reference signal resource set being used to trigger a first BFR, the first reference signal resource set being a reference signal resource set in the first reference signal resource pool; determining a resource assignment of a first uplink grant according to logical channel prioritization; and when the first uplink grant can accommodate a first MAC CE, transmitting a first MAC PDU comprising the first MAC CE on resources of the first uplink grant;

wherein any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

20. A method in a second node for wireless communications, comprising:

transmitting a first signaling, the first signaling configuring a first reference signal resource pool, the first reference signal resource pool comprising at least one reference signal resource set; transmitting all reference signal resources in each reference signal resource set in the first reference signal resource pool, a measurement performed on a first reference signal resource set being used to trigger a first BFR, the first reference signal resource set being a reference signal resource set in the first reference signal resource pool; a resource assignment of a first uplink grant is determined based on logical channel prioritization; and receiving a first MAC PDU comprising a first MAC CE; when the first uplink grant can accommodate the first MAC CE, the first MAC PDU comprising the first MAC CE being transmitted on resources of the first uplink grant;

wherein any reference signal resource set in the first reference signal resource pool comprises at least one reference signal resource of a first cell; the first MAC CE is used to indicate the first BFR; a first parameter set is used to determine an order of the first MAC CE in the logical channel prioritization, and the first parameter set comprises a number of the reference signal resource set(s) comprised in the first reference signal resource pool; when the number of the reference signal resource set(s) comprised in the first reference signal resource pool is 1, the order of the first MAC CE in the logical channel prioritization is a first order; when the number of the reference signal resource sets comprised in the first reference signal resource pool is greater than 1, the order of the first MAC CE in the logical channel prioritization is an order in a first candidate order set, and the first candidate order set comprises at least a second order; the first order is higher than the second order.

* * * * *